(12) United States Patent
O'Keefe et al.

(10) Patent No.: US 12,122,063 B2
(45) Date of Patent: *Oct. 22, 2024

(54) CUTTING DEVICE

(71) Applicant: Frelk Industries Pty. Ltd., Torquay (AU)

(72) Inventors: Fraser Thomas O'Keefe, Burleigh Waters (AU); Andrew Loch, Worongary (AU); William McMinn, Coomera (AU); Michael James Elkington, New Farm (AU)

(73) Assignee: Frelk Industries Pty. Ltd., Torquay (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,471

(22) Filed: Sep. 11, 2023

(65) Prior Publication Data

US 2024/0066741 A1 Feb. 29, 2024

Related U.S. Application Data

(63) Continuation of application No. 17/746,076, filed on May 17, 2022, now Pat. No. 11,752,653, which is a (Continued)

(30) Foreign Application Priority Data

Aug. 3, 2009 (AU) ............................. 2009203210

(51) Int. Cl.
*B24D 5/12* (2006.01)
*B23D 45/12* (2006.01)
(Continued)

(52) U.S. Cl.
CPC ............... *B27B 5/32* (2013.01); *B23D 45/12* (2013.01); *B24B 45/006* (2013.01); *B24D 5/12* (2013.01);
(Continued)

(58) Field of Classification Search
CPC .... B23D 21/14; B23D 21/145; B24B 45/006; B27B 5/32; B27B 45/006
See application file for complete search history.

(56) References Cited

U.S. PATENT DOCUMENTS 3,939,561 A * 2/1976 Nichols .................. B23D 21/08
30/107
3,999,292 A * 12/1976 Breese .................. B23D 21/14
30/105
(Continued)

*Primary Examiner* — Sean M Michalski

(57) ABSTRACT

A cutting device for cutting a pipe having a pipe wall. The cutting device includes an elongate carrier having a tool end which is engageable with a power tool and an opposed free end. The device includes a guide wheel located at the free end of the carrier which is loosely mounted thereon for rotation relative thereto, having a bearing surface extending parallel to a longitudinal axis of the carrier. The device also includes a cutting element having a peripheral cutting edge which is located adjacent to the guide wheel being positioned intermediate the guide wheel and the tool end. The cutting element is of greater transverse dimension than the guide wheel so that when the bearing surface bears against an internal surface of the pipe the distance between the cutting edge of the cutting element and the bearing surface enables the cutting element to cut through the pipe wall.

13 Claims, 19 Drawing Sheets

Related U.S. Application Data continuation of application No. 13/388,734, filed as application No. PCT/AU2010/000981 on Aug. 3, 2010, now abandoned.

(51) Int. Cl.

| | | |
|---|---|---|
| *B24B 45/00* | (2006.01) | |
| *B24D 5/16* | (2006.01) | |
| *B26D 1/00* | (2006.01) | |
| *B26D 1/14* | (2006.01) | |
| *B26D 3/16* | (2006.01) | |
| *B26D 7/00* | (2006.01) | |
| *B27B 5/32* | (2006.01) | |

(52) U.S. Cl.
CPC ............. *B24D 5/16* (2013.01); *B26D 1/0006* (2013.01); *B26D 1/14* (2013.01); *B26D 3/163* (2013.01); *B26D 3/166* (2013.01); *B26D 7/0006* (2013.01); *B26D 2001/002* (2013.01); *B26D 2001/0046* (2013.01); *Y10T 83/04* (2015.04); *Y10T 83/8878* (2015.04)

(56) References Cited

U.S. PATENT DOCUMENTS

| | | | | |
|---|---|---|---|---|
| 4,177,559 A | * | 12/1979 | Anderson | B23D 21/145 |
| | | | | 30/105 |
| D273,194 S | * | 3/1984 | House | B23D 45/128 |
| | | | | D15/139 |
| 5,815,926 A | * | 10/1998 | Ekern | B23D 45/128 |
| | | | | 30/103 |
| 2019/0145209 A1 | * | 5/2019 | Gromes, Sr. | B24C 3/325 |
| | | | | 30/103 |

* cited by examiner

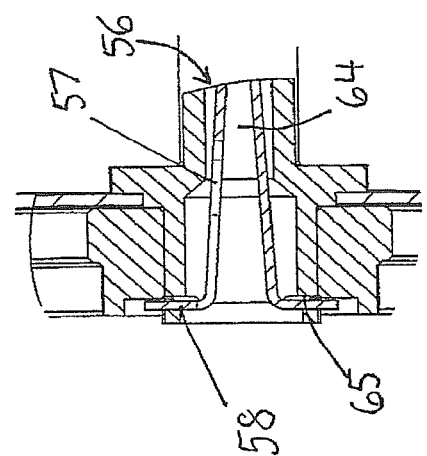
FIGURE 11
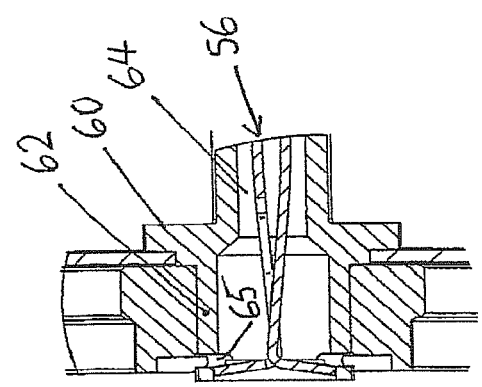
FIGURE 10
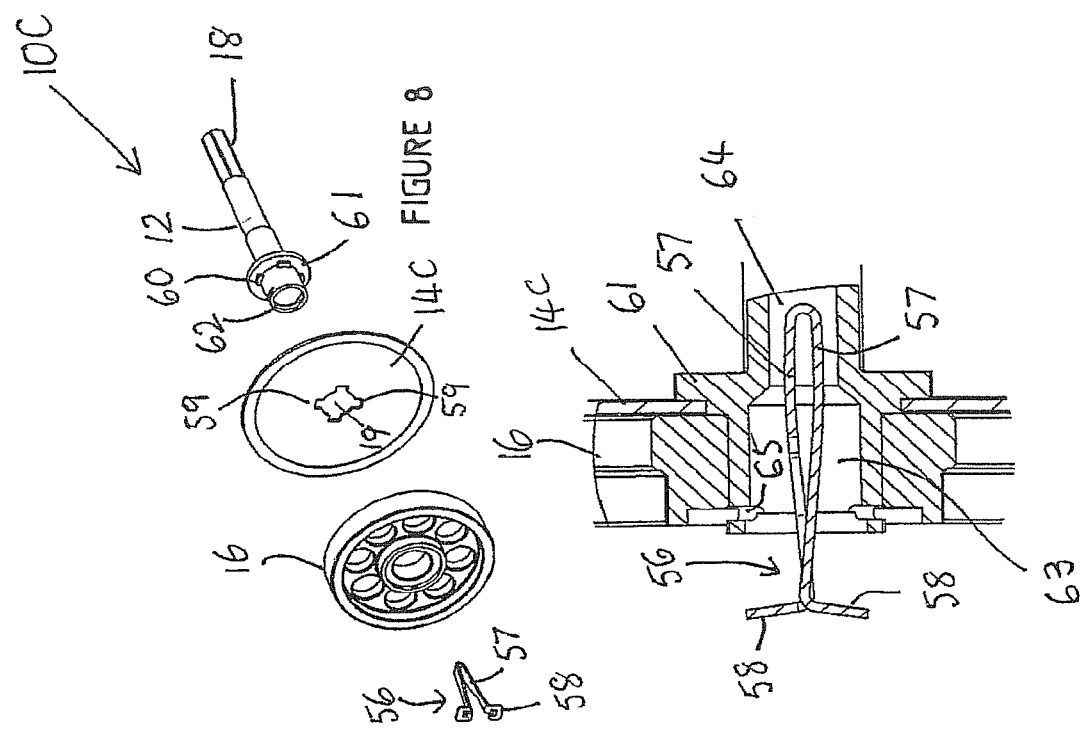
FIGURE 8
FIGURE 9

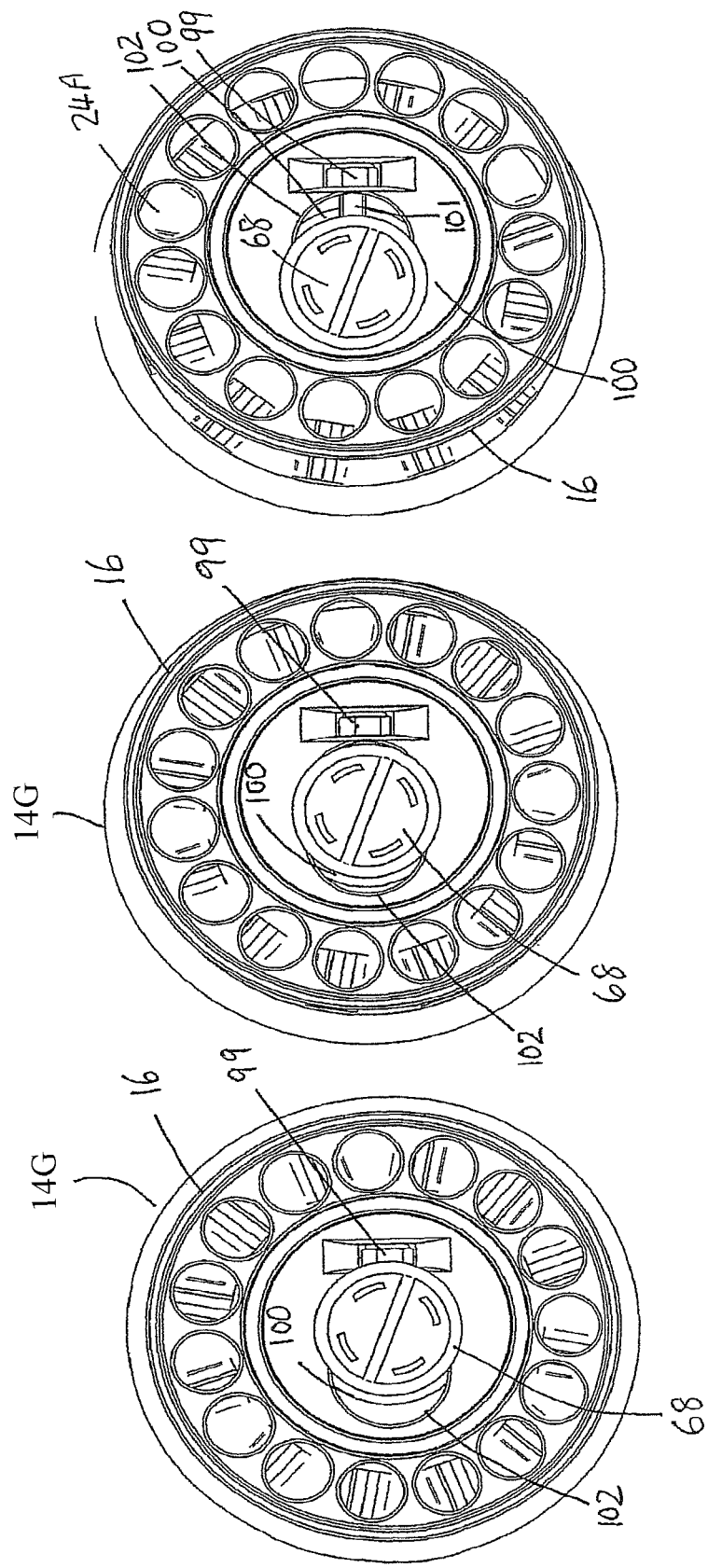

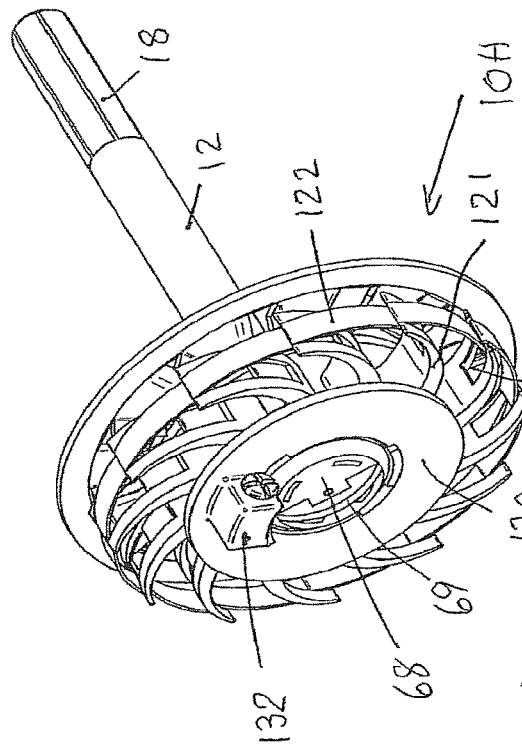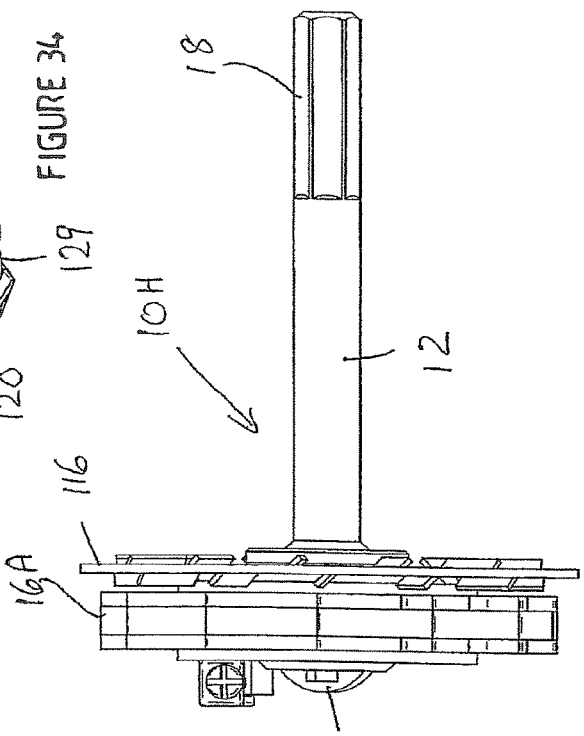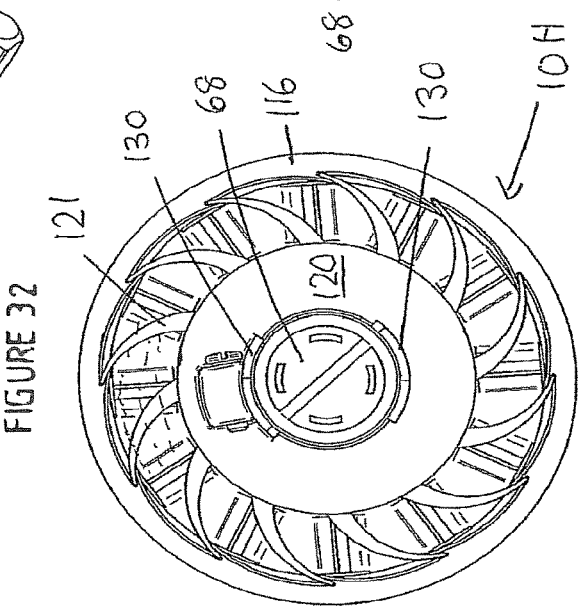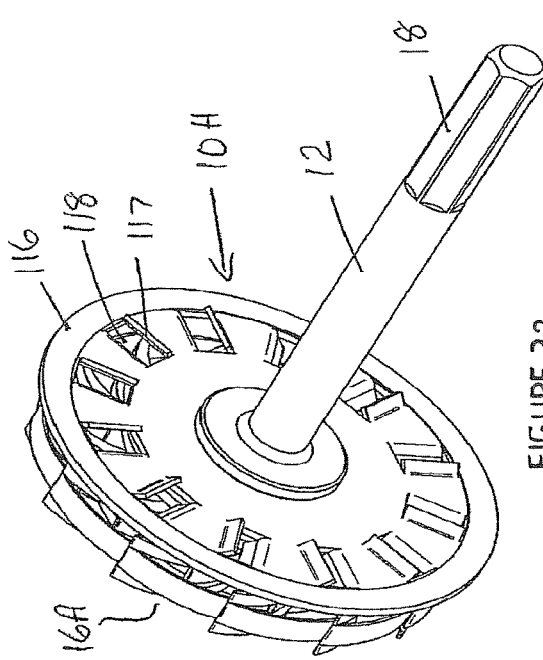

CUTTING DEVICE

FIELD OF THE INVENTION

This invention relates to a cutting device. It also extends to a cutting element for a cutting device, a guide or support member for use with a cutting device and a method of use of a cutting device.

The invention relates particularly but not exclusively to a cutting device that is suited to cutting pipes including pipes that are already installed in a structure. It will therefore be convenient to hereinafter describe the invention with reference to this application. However, it is to be understood that it is capable of broader application. For example, it can be used to cut sheets as well as pipes. Where the term "sheets" is used herein it shall be interpreted to cover concrete slabs, panels or even walls.

BACKGROUND TO THE INVENTION

Generally, to cut a pipe such as a PVC pipe, a user uses a cutting disc. However, if the pipe is built into a floor or a wall, it may not be possible to gain access to an exterior of the pipe and it is necessary to cut the pipe from the inside of the pipe. Thus, for example U.S. Pat. No. 4,576,070 describes a pipe cutter which requires that the pipe cutter be inserted at an angle to a longitudinal axis of the pipe. This results in the side wall of the pipe being cut with a chamfer or bevel and will not be desirable. The arrangement is also unstable, and an uneven or non-uniform cut could result.

More particularly U.S. Pat. No. 4,576,070 refers to a pipe cutter wherein a power tool imparts rotational torque to a shaft having a circular cutting blade which is oriented orthogonally to the shaft. There is also provided a guide wheel which is journaled onto an end of the shaft remote from the cutting tool. In use the cutting blade is aligned at an angle to the longitudinal axis of the pipe being cut so that it pierces a side wall of the pipe and upon rotation of the cutting blade it pierces the side wall. The guide wheel is attached to the shaft in such a manner that it does not rotate. Disadvantages of this conventional pipe cutter include the feature that the guide wheel has to engage the entire internal surface of the pipe to operate and also that the guide wheel is located at a substantial distance from the cutting wheel. Also, the cutting wheel is of smaller diameter than the guide wheel. These factors in combination mean that in practice there will be gaps between the internal surface of the pipe and the guide wheel as well as a substantial gap between the internal surface of the pipe and the cutting wheel. This will severely impair the cutting efficiency of the pipe cutter because the guide wheel does not provide a secure support for the cutting wheel in use. The cutting wheel may laterally move in an unrestrained manner and cause injury and also cause an uneven cut. The cutting wheel will also have a tendency to wobble as the shaft is not oriented in a direction that coincides with the longitudinal axis of the pipe. Also, this pipe cutter cannot be easily removed from the pipe after use and could not be used for pipes of different diameters.

Reference may also be made to U.S. Pat. No. 5,815,926 which refers to a similar arrangement as described above in regard to U.S. Pat. No. 4,576,070 with the exception that the guide wheel abuts an adjacent end of the pipe being cut and the cutting wheel which is of smaller diameter than the guide wheel is also located at a substantial distance from the guide wheel inside the pipe. Because of these structural limitations it is considered that the same disadvantages as discussed above will also apply to this reference. In addition, the location of the guide wheel on top of the pipe being cut would be difficult to maintain in practice and this would cause safety problems. Another disadvantage of this arrangement is that the pipe being cut before this conventional pipe cutter was used had to have an end which was exactly normal to the longitudinal axis of the pipe. Similar problems would occur with use of Japanese Patent Publication 2002-187014 which is of similar structure.

Reference also may be made to Japanese Patent Publication 10-216376 which describes a pipe cutter which has a cutting wheel adjacent a free end of the cutter in use. There is also provided a guide wheel which is attached to a rotational shaft of the cutter which is driven by a power tool. However, it is noted that the guide wheel is located above the cutting wheel and thus the bearing wheel will bear against the portion of the pipe that is being cut off and removed from the remainder of the pipe. This will impair cutting because the cut part of the pipe will move during use of the pipe cutter and thus cause an uneven cut. In addition to this point the guide wheel will become more ineffective as the cut continues due to a loss of the bearing surface. When a cut is completed a follow through action by the user can cause a wild and uncontained movement of the power tool which can be dangerous.

It would therefore be advantageous to provide a cutter that ameliorates at least some of the disadvantages of the prior art cutters described above. It would be advantageous if a cutter could be devised that could be operated safely with minimal risk of injury to the operator. It would also be useful if a cutter could be devised that could efficiently and effectively cut a pipe, particularly when access to the pipe is limited.

SUMMARY OF THE INVENTION

According to one aspect of this invention there is provided a cutting device for cutting a work piece, the cutting device including:
(i) an elongate carrier having a longitudinal axis, a tool end which is engageable with a power tool and a free end;
(ii) a guide or support member located towards the free end of the carrier which is rotatably attached to the carrier and which has a bearing surface extending parallel to the longitudinal axis of the carrier;
(iii) a cutting element having a peripheral cutting edge which cutting element is located intermediate the guide member and the tool end of the carrier wherein the cutting element is located closely adjacent to the guide member and is of greater transverse dimension than the guide member thereby forming,
(iv) a peripheral space between the cutting edge of the cutting element and the bearing surface of the guide member which in use is occupied by that portion of the blade which cuts through the work piece being cut.

The provision of the space or spacing, e.g. a peripheral spacing, as described above is useful in that it serves as a depth gauge and facilitates a user cutting the pipe or sheet to the required depth or thickness and stops the cutting element from travelling beyond the confines of the pipe being cut during use.

The axial distance between the cutting element and the guide member may be from 0.5-5.0 mm, for example 0.5-1.0 mm. This will also have relevance to the meaning of "closely adjacent" which means that the cutting element and the guide or support member are only separated by a short axial distance as exemplified above to provide for formation of the space.

In this regard it is pointed out that none of the prior art discussed above describes features (iii) and (iv) which has the following advantages:—

(a) the guide or support member by being located internally of the cutting element, e.g. on the other side of the cutting element to the tool end which is attached to the power tool, as shown in the drawings of the preferred embodiment hereinafter, does not deflect and provides a strong and stable support for the cutting element because it substantially engages a surrounding bearing surface of the pipe or sheet being cut in use without any gaps being present;

(b) because of (a) above there is no lateral movement of the cutting element in use which means that the cutting device of the invention is very safe to use and thus will comply with all relevant workplace health and safety regulations in relevant jurisdictions;

(c) it is very easy to separate the cutting device of the invention and the pipe or sheet being cut after use; and (d) the guide member having a bearing surface that extends parallel to a longitudinal axis of the carrier and being spaced from the cutting element may rotate counter to the direction of rotation or in direction of rotation of the cutting element which in use facilitates displacement of the cutting device about an interior of a pipe being cut and thus makes the cutting device very efficient in use.

The guide or support member may be in the form of a guide wheel that is loosely mounted on the elongate carrier such that it can rotate relative thereto, e.g. it can rotate freely relative to the carrier. The carrier may be in the form of a rod or shaft.

The cutting device may include a retaining formation that is located at the free end of the carrier and which has a larger transverse dimension than the carrier so as to loosely retain a seat or hub of the guide or support member on the carrier.

The carrier may have a threaded portion adjacent the retaining formation and a nut may be threaded onto the threaded portion of the carrier to hold the cutting element on the carrier.

The elongate carrier may have at least one key and the cutting element may define at least one keyway that is capable of retaining engagement with the key on the carrier. Conveniently the elongate carrier may include a pair of keys that engage with a corresponding pair of keyways on the cutting element.

The cutting device may include a disc on the carrier and fast therewith that incorporates said pair of keys. The disc may be rigidly attached to the carrier or may be machined out of the carrier.

The cutting device may include a compression ring which engages a mating groove located in an end cap attached to the free end of the carrier and an aligned groove on the carrier whereby to securely retain the cutting element on the elongate carrier.

The cutting device may include a spring clip having a pair of outwardly extending legs biased away from each other and a pair of adjacent end projections or tabs located at a free end of each leg which engage with corresponding notches on the carrier, e.g. towards the free end thereof, to securely retain the guide or support member and the cutting element on the elongate carrier.

The spring clip may have one end remote from the pair of end projections or tabs which is releasably attached to an end cap attached to the carrier at the free end thereof.

The cutting device may include an end cap attached to the free end of the carrier defining an internal bore and a spring located within the internal bore. The cutting device may also include a longitudinal pin having a tapered surface and a pair of transverse pins also having a tapered surface whereby the tapered surfaces of the longitudinal pin and each transverse pin abuts each other when each transverse pin is located in a corresponding notch or groove of the carrier to securely retain the guide or support member and the cutting element on the carrier.

The cutting device may include an end fastener at the free end of the carrier which engages with an internal passage of the carrier to provide a force against a bushing surrounding the end fastener to ensure that the cutting disc and guide or support member are securely retained on the carrier.

The end fastener may have a screw thread that engages with a complementary screw thread formed on an internal wall of the carrier forming the internal passage.

According to another aspect of this invention there is provided a cutting device including:

(i) an elongate carrier having a longitudinal axis, a tool end that can be operatively coupled to a power tool and a free end;

(ii) a guide or support member located towards the free end of the carrier which is rotatably attached to the carrier and which has a bearing surface extending parallel to a longitudinal axis of the carrier; and (iii) a cutting element having a peripheral cutting edge which cutting element is located intermediate the guide or support member and the tool end.

The cutting element may be located closely adjacent to the guide or support member.

The cutting device may include any one or more of the features of the cutting device defined above according to the first aspect of the invention.

The cutting device may include an eccentric cam member defining an internal cavity and an adjustable collar mounted to the carrier and received within the internal cavity of the eccentric cam member, wherein the cutting element is moved in a similar direction to provide a spacing between the guide or support member and the cutting element, which corresponds to a desired wall thickness of a pipe or sheet being cut in use.

The adjustable collar may have a screw threaded shank or shaft to which is attached an adjustment nut wherein the shank or shaft extends through a side wall of the eccentric cam member and actuation of the nut causes said movement of the adjustable collar relative to the eccentric cam member having an effective limit governed by abutment of the adjustable collar with end walls of the internal cavity.

According to another aspect of the invention there is provided a cutting blade for use with a cutting device for cutting a work piece, e.g. cutting through a side wall of a pipe or through a sheet, which is mountable to a rotatable carrier or shaft, the blade comprising a cutting element including a plurality of deflector vanes, each deflector vane being located inward from a peripheral edge of the cutting element and the blade defining an aperture therein adjacent to each deflector vane, whereby in use swarf or dust generated by the pipe or shaft being cut is directed by each deflector vane through an adjacent aperture away from a face of a user.

The cutting element may be substantially planar and the cutting element may be substantially circular.

According to yet another aspect of this invention there is provided a guide or support member for use with a cutting device for cutting a workpiece, e.g. a side wall of a pipe or a sheet, which is mountable to a rotatable carrier or shaft in conjunction with a cutting element also mountable to the carrier or shaft, the guide or support member including a pair of opposed end components and an intermediate assembly of a plurality of pivotable vanes which are each connected at their respective outer ends by a connecting element or strap, whereby each of the vanes is movable from an inner location to an outer location which define inner and outer limits of a transverse dimension of the guide or support member whereby to adjust the diameter of the guide or support member.

Each vane may be arcuate and each of the vanes may have a similar curvature having one concave side and an opposed convex side, e.g. when the guide or support member is viewed from one end.

Each vane may define a slot and respective outer ends of adjacent connection elements may be capable of sliding displacement in the slot upon pivotal movement of each vane whereby to adjust the diameter of the guide or support member.

Respective inner ends of each vane may be pivotably attached to one or each end component. Further respective inner ends of each vane have an internal aperture for determining the limits of pivotal movement of each vane.

According to yet another aspect of this invention there is provided a method of use of a cutting device to cut a work piece which includes the following:
  (a) attaching one end of a rotatable elongate carrier to a power tool which at another end has a guide member rotatably attached thereto and a cutting element attached to the rotatable carrier inwardly of the guide member wherein said cutting element also has a greater transverse dimension than the guide member and is located closely adjacent to the guide member so as to form a peripheral space between the guide member and the cutting element;
  (b) operating the power tool to cause rotation of the rotatable carrier wherein the guide member rotates along a surface of the work piece being cut, wherein said bearing surface is parallel to a longitudinal axis of the rotatable carrier; and
  (c) cutting through the work piece.

The work piece may be a pipe in which case cutting through a side wall of the pipe may comprise extending the cut around the full circumference of the pipe with the guide member rotating along an inner surface of the pipe so that the side wall of the pipe is completely severed from the remainder of the pipe. The longitudinal surface of the carrier may be parallel to and spaced from a longitudinal axis of the pipe.

Instead, the work piece may be a substantially planar sheet of material.

The guide member may rotate counter to the direction of rotation of the cutting element. Instead, the guide member may rotate in the same direction as the cutting element but independently thereof and at a slower speed of rotation.

According to yet another aspect of this invention there is provided a method of cutting a pipe to remove an end region of the pipe, the method including:
  providing a rotatable elongate carrier having one end for coupling to a power tool and a guide member rotatably attached thereto towards another end and a cutting element attached to the rotatable carrier in between the guide member and said one end, the cutting element having a greater transverse dimension than the guide member,
  rotating the rotatable carrier whereby to rotate the cutting element whereby to enable it to cut through the pipe, and
  displacing the guide member around an inner surface of the pipe whereby to guide the cutting element around the pipe while cutting the pipe along a cutting line transverse to the axis of the pipe.

Rotating the carrier may comprise rotating the carrier and thereby also the blade at high speed by operatively coupling it to a power tool.

Displacing the guide member may guide the cutting element around the full circumference of the pipe whereby to cut the pipe through completely and remove the end region of the pipe.

Displacing the guide member may comprise displacing it around the pipe surface in a direction that is counter to the direction of rotation of the cutting element.

The guide member may include a bearing surface and displacing the guide member may comprise contacting the bearing surface with an internal surface of the side wall of the pipe being cut or an adjacent surface of a sheet being cut.

BRIEF DESCRIPTION OF THE DRAWINGS AND DETAILED DESCRIPTION OF THE EMBODIMENTS ILLUSTRATED IN THE DRAWINGS

A cutting device for cutting pipes and a method for cutting pipes in accordance with this invention may manifest itself in a variety of forms. It will be convenient to hereinafter describe several embodiments of the invention in detail with reference to the accompanying drawings. The purpose of providing this detailed description is to instruct persons having an interest in the subject matter of the invention how to carry the invention into practical effect. However, it is to be clearly understood that the specific nature of this detailed description does not supersede the generality of the preceding broad description. In the drawings:

FIG. 1 refers to a perspective view of a first embodiment of a cutting device of the invention;

FIG. 2 refers to an exploded perspective view of the invention of the cutting device shown in FIG. 1;

FIG. 8 is an exploded perspective view of a fourth embodiment of the present invention;

FIGS. 9, 10 and 11 are sectional views of the embodiment shown in FIG. 8;

Figure 12:
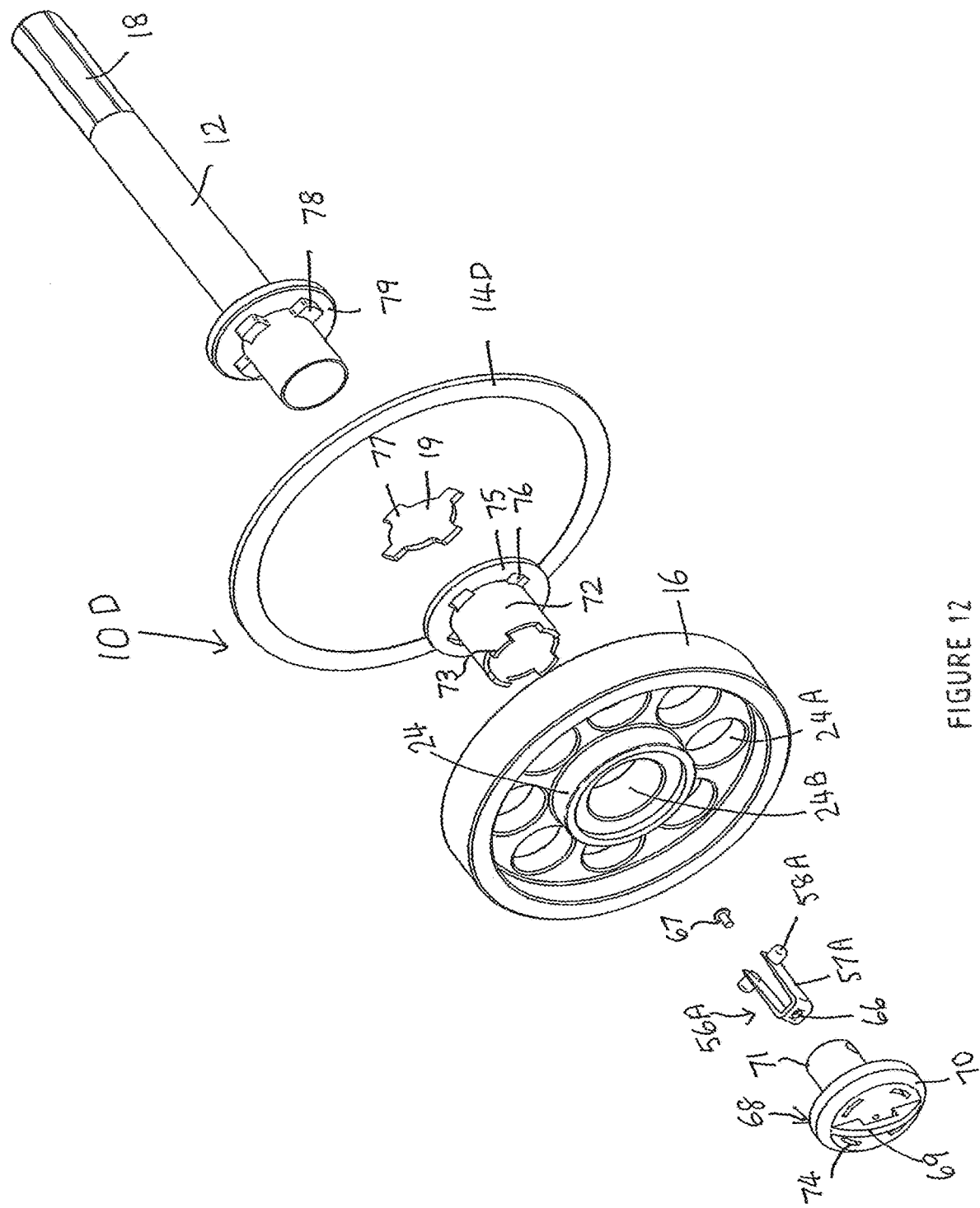
Figure 15:
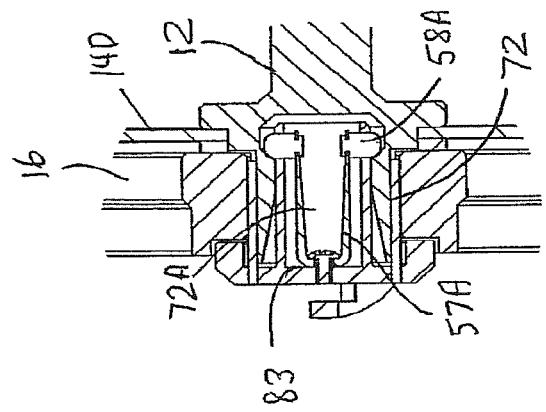
Figure 14:
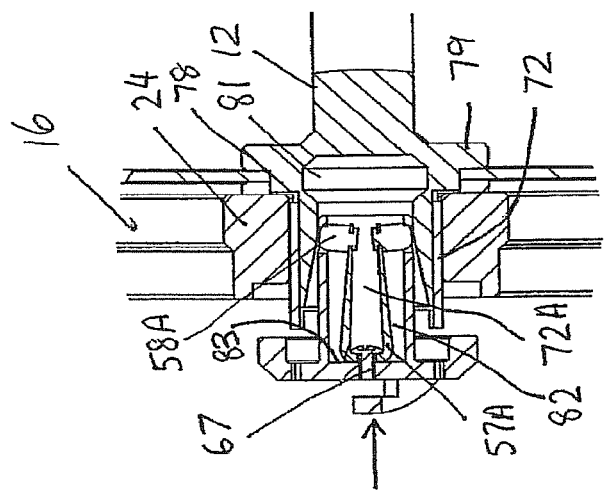
Figure 13:
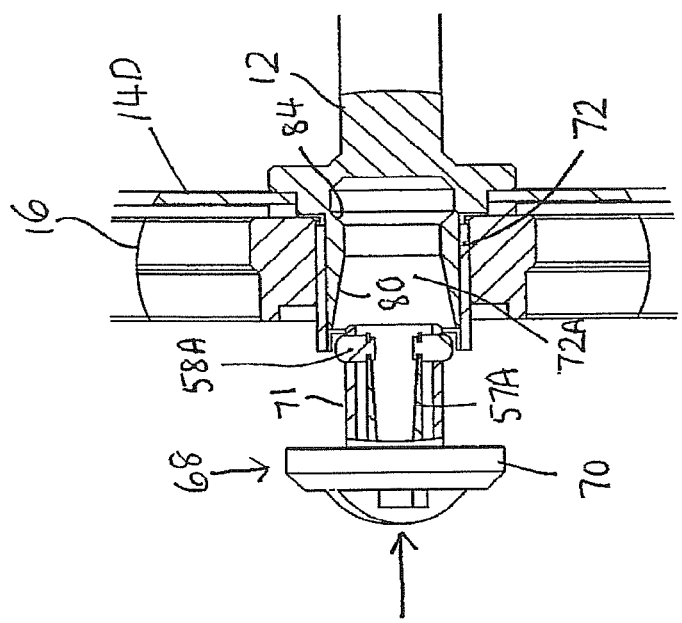
Figure 16:
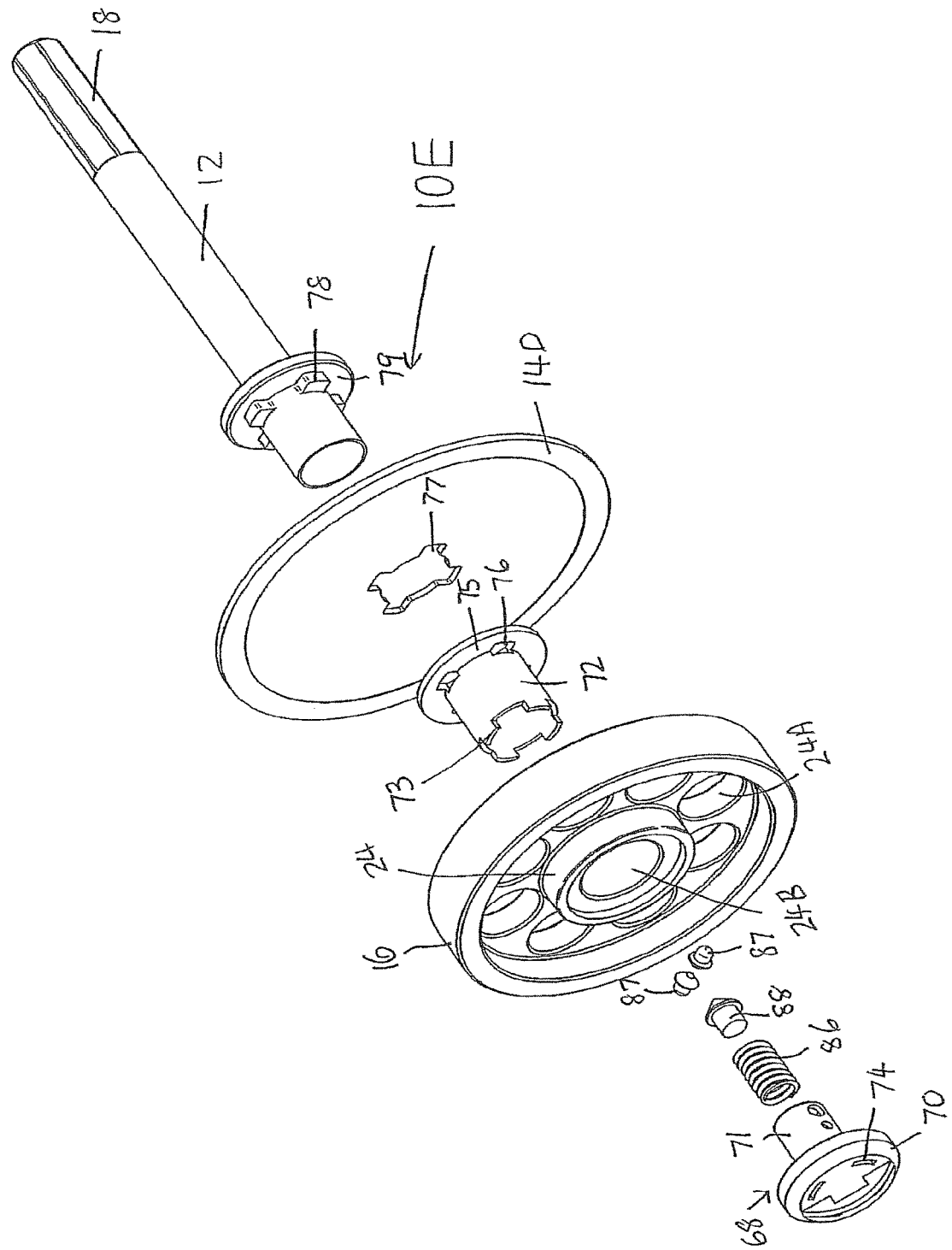
Figure 19:
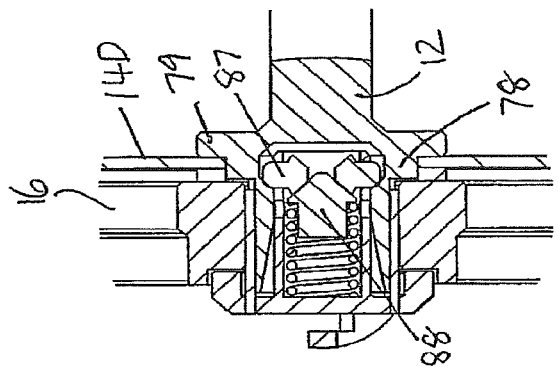
Figure 18:
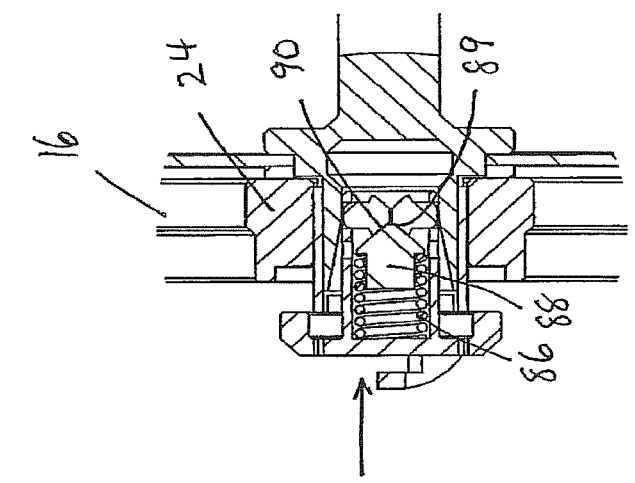
Figure 17:
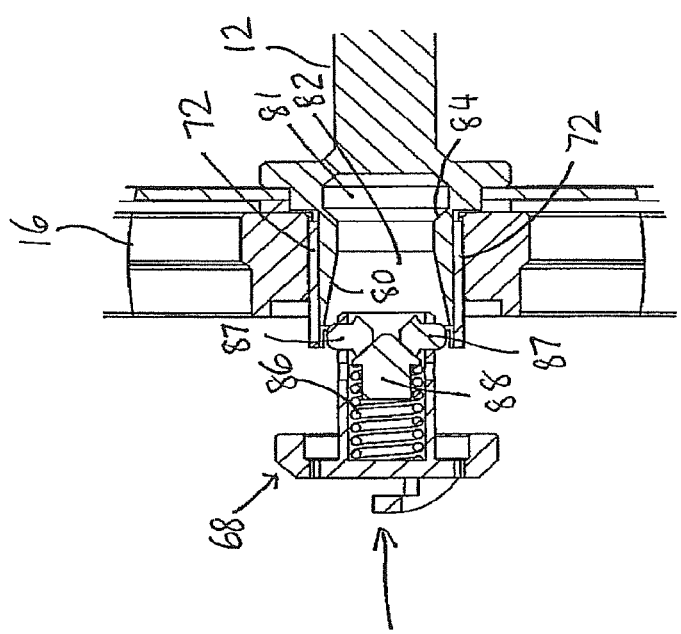
Figure 20:
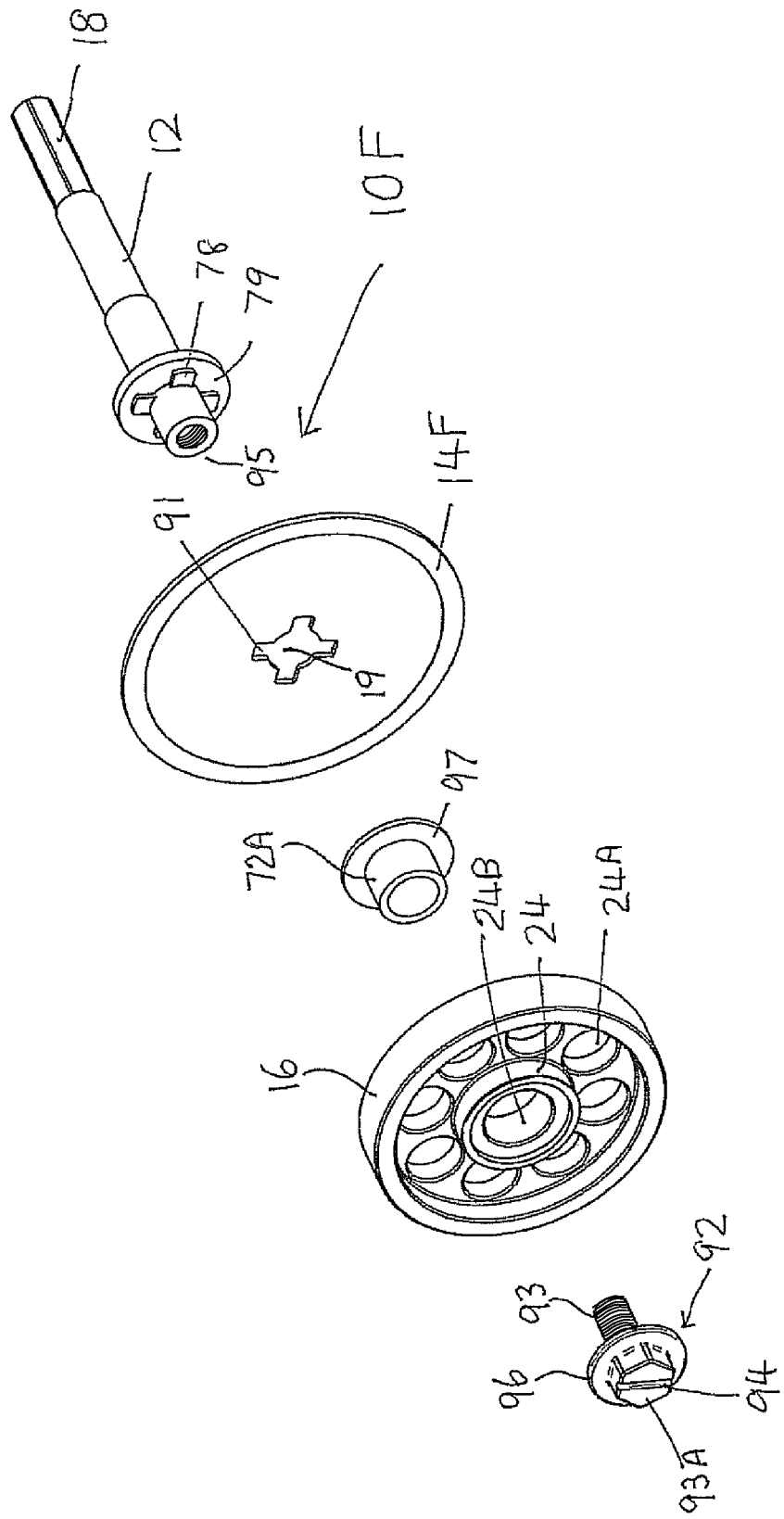
Figure 21:
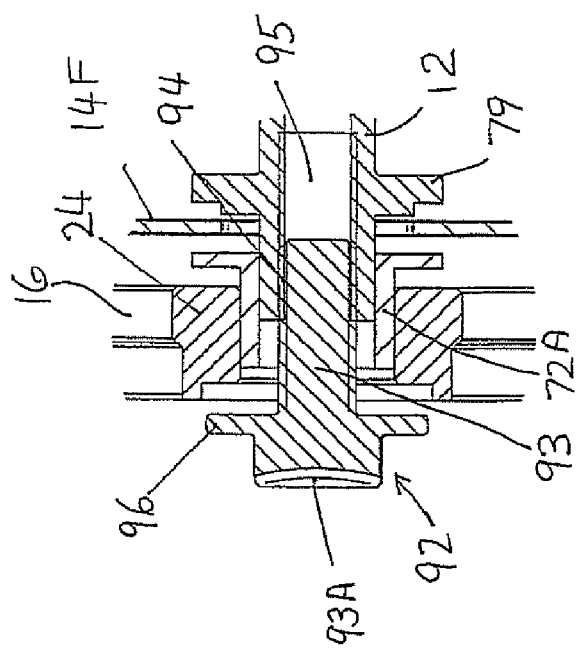
Figure 22:
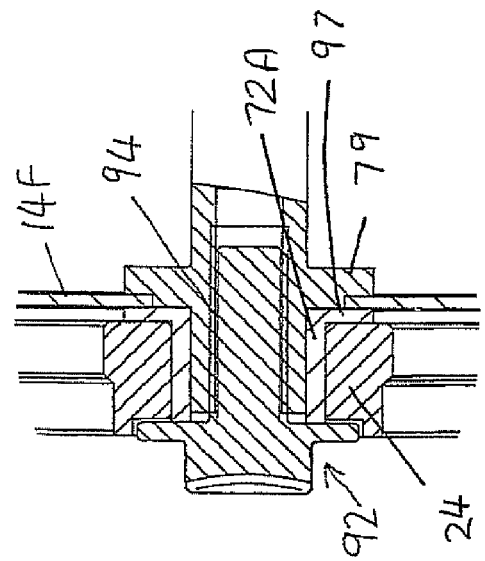
Figure 23:
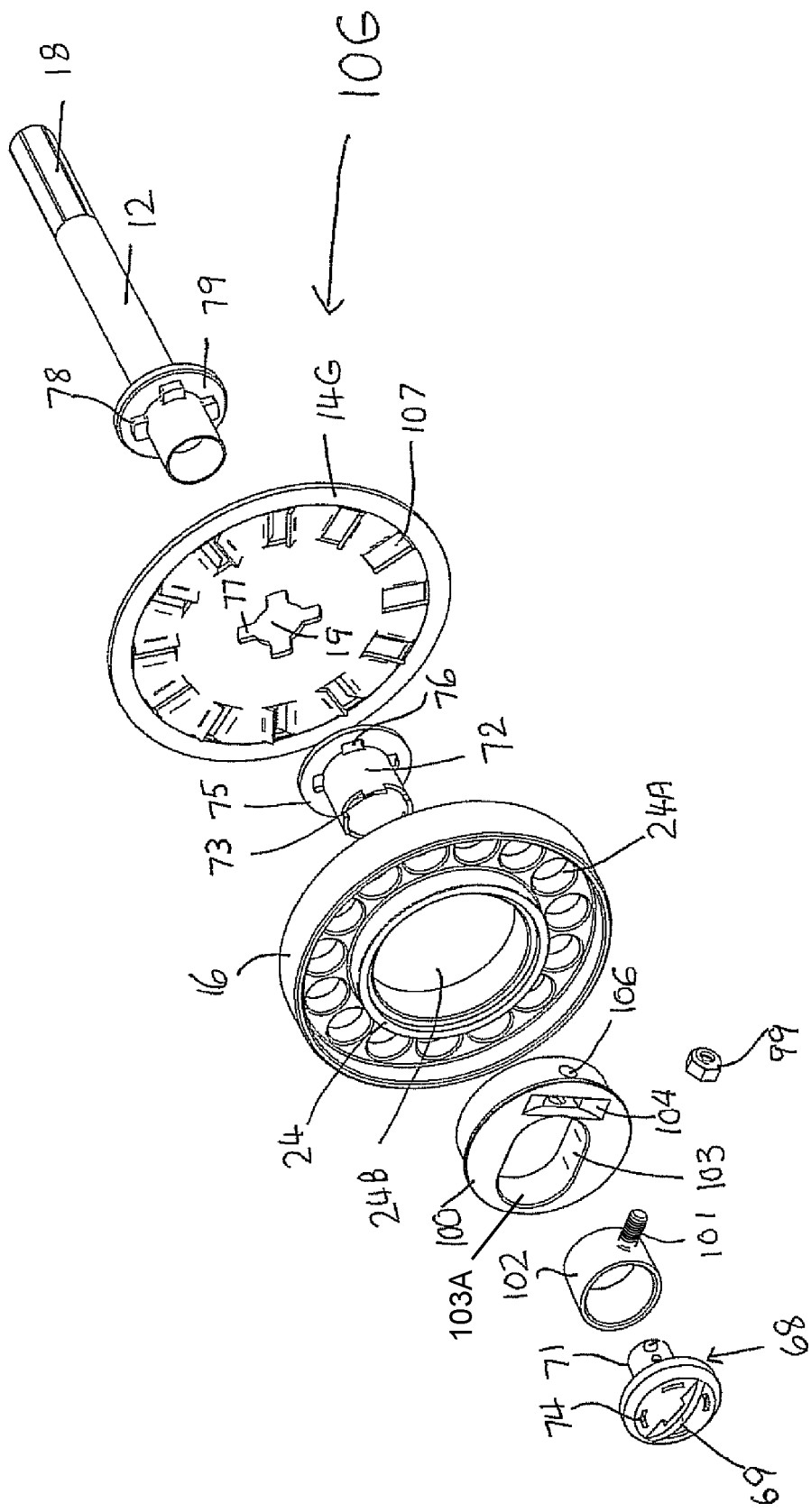
Figure 27:
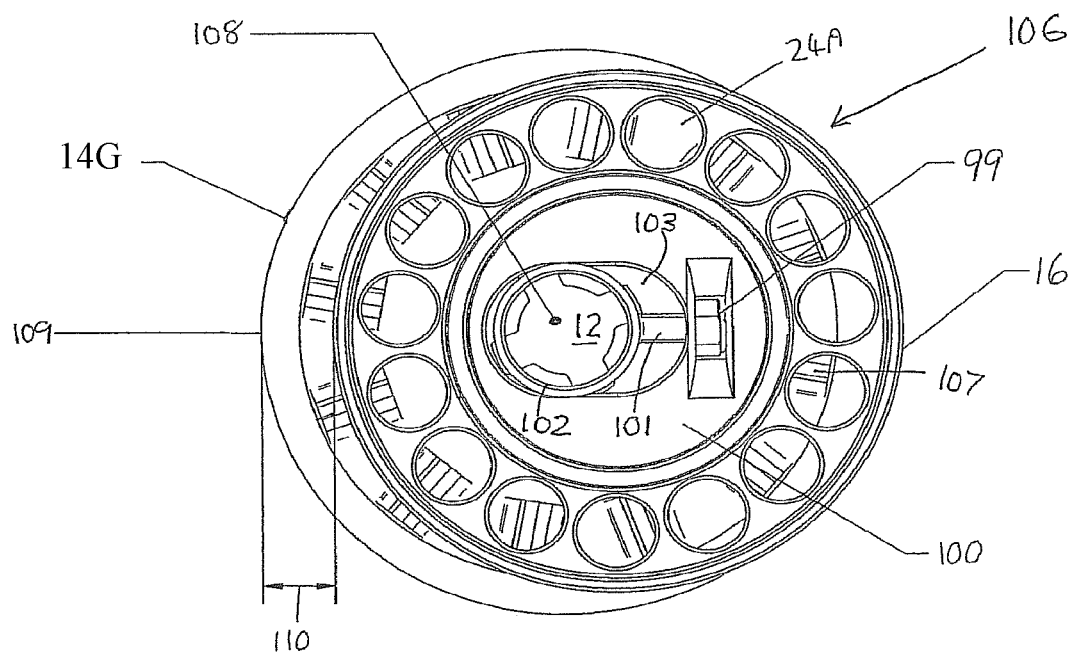
Figure 28:
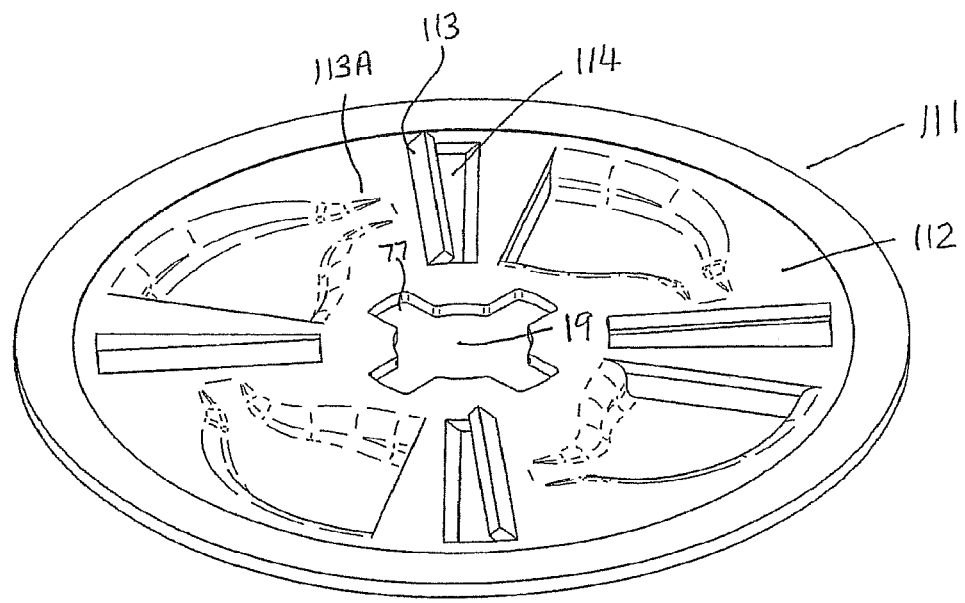
Figure 29:
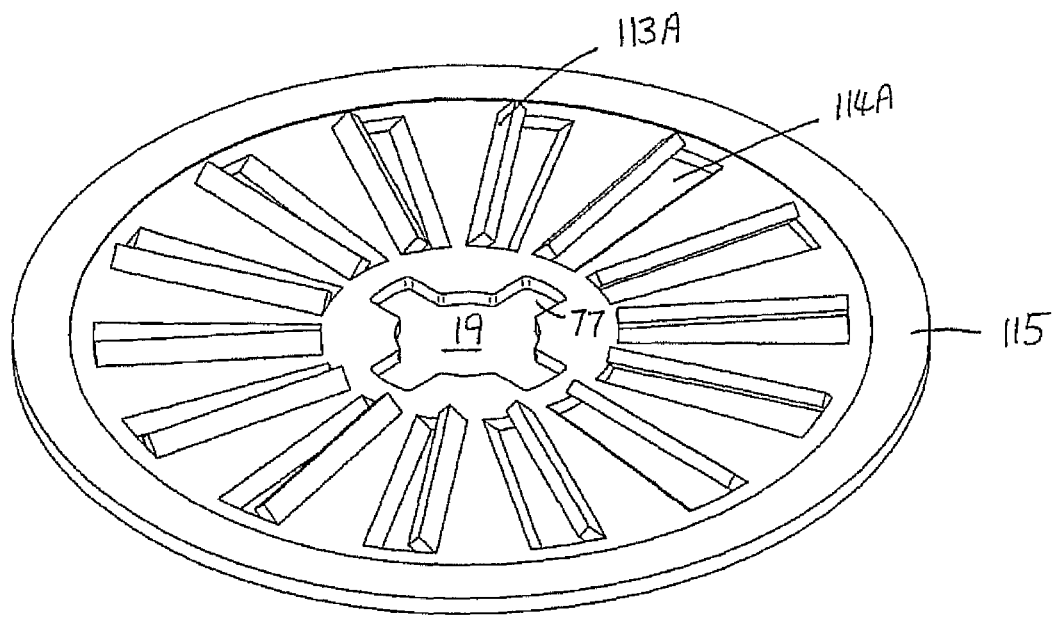
Figure 30:
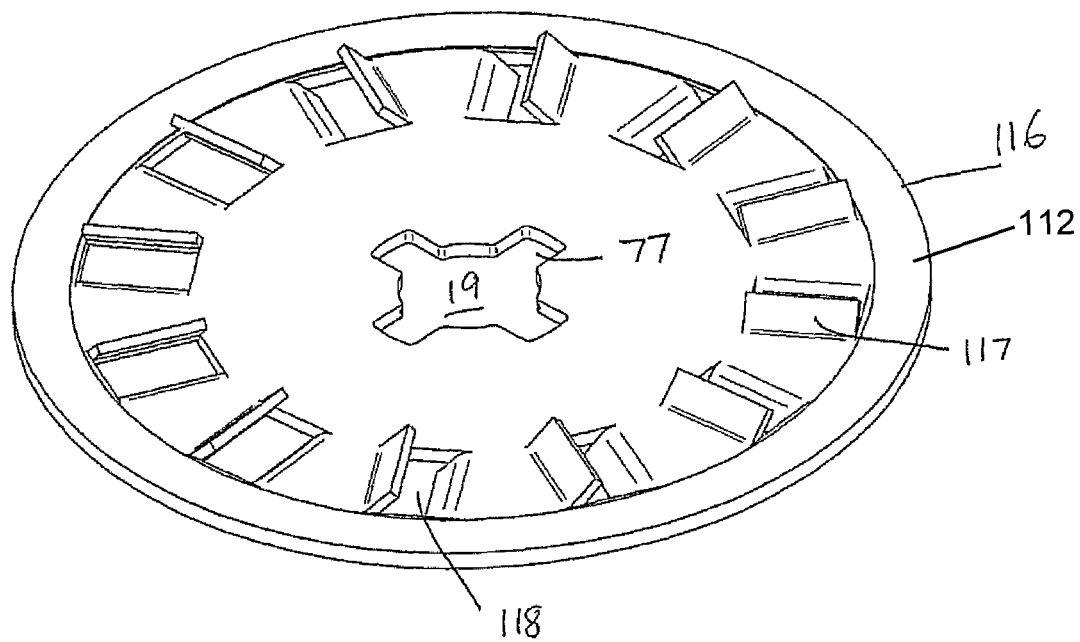
Figure 31:
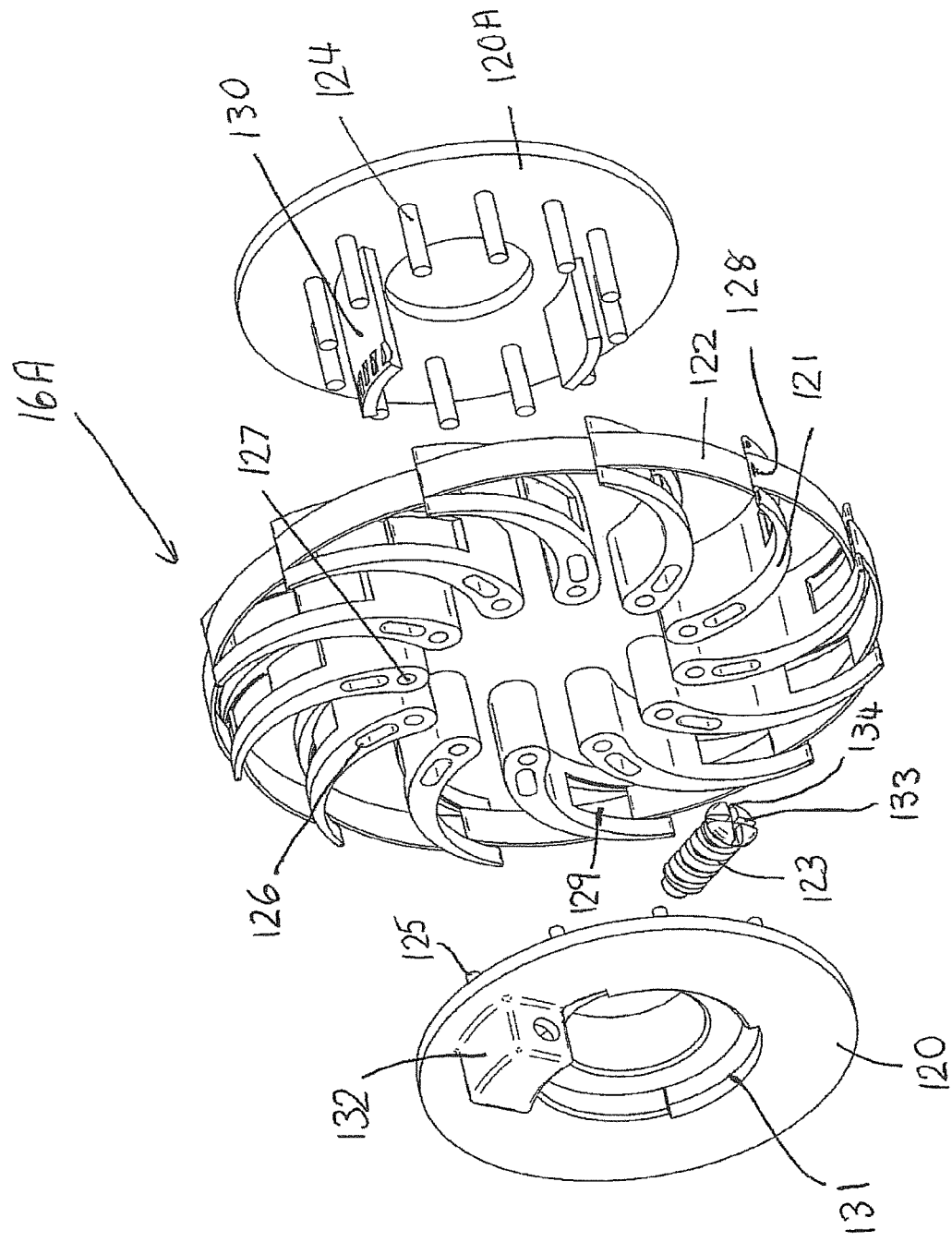
Figure 36:
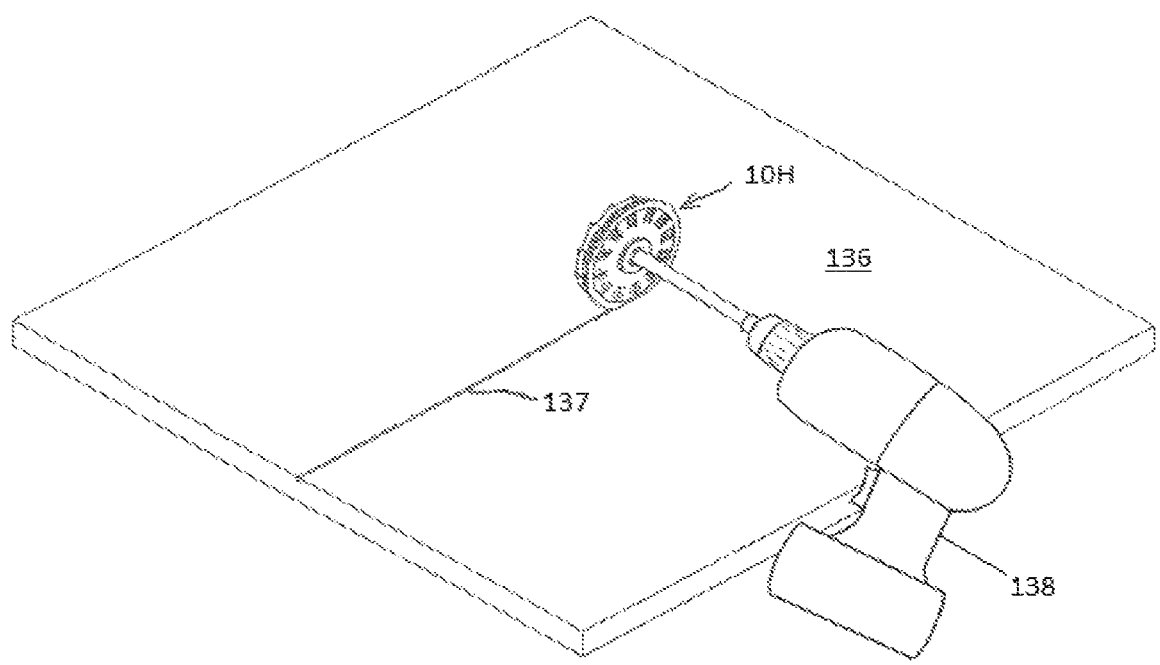

FIG. 12 refers to an exploded perspective view of a fifth embodiment of the present invention;

FIGS. 13, 14 and 15 refer to sectional views of the embodiment shown in FIG. 12;

FIG. 16 refers to an exploded perspective view of an alternative fifth embodiment of the invention;

FIGS. 17, 18 and 19 are sectional views of the embodiment shown in FIG. 16;

FIG. 20 represents an exploded perspective view of a sixth embodiment of the invention;

FIGS. 21 and 22 are sectional views of the embodiment shown in FIG. 20;

FIG. 23 represents an exploded perspective view of the seventh embodiment of the invention;

FIGS. 24, 25 and 26 represent front views of the embodiment shown in FIG. 23;

FIG. 27 refers to a front view of the embodiment shown in FIG. 23 with the end cap removed;

FIGS. 28, 29 and 30 represent cutting discs for use in the invention for use in directing dust and swarf away from the user;

FIG. 31 represents an exploded perspective view of a modified guide member for use in the invention;

FIGS. 32, 33, 34 and 35 show the guide wheel of FIG. 31 and the dust extractor cutting disc of FIG. 30 mounted to a rotatable shaft; and FIG. 36 shows the cutting apparatus of FIGS. 32, 33, 34 and 35 in cutting a flat sheet or panel.

In the drawings, reference numeral 10 generally designates an embodiment of a pipe cutting device.

Figure 1:
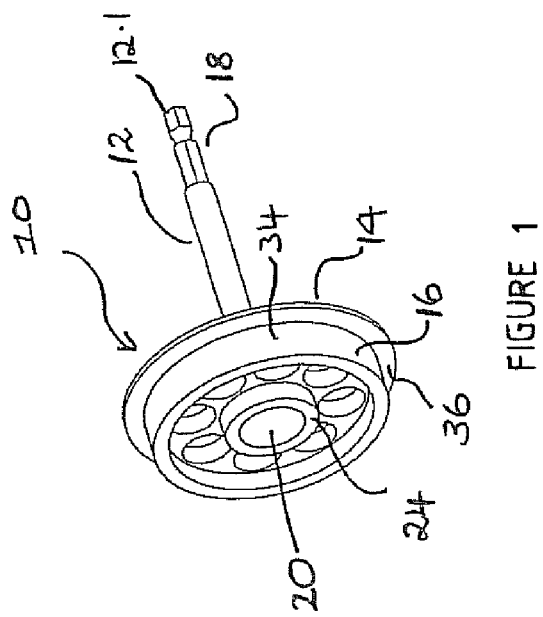
Figure 2:
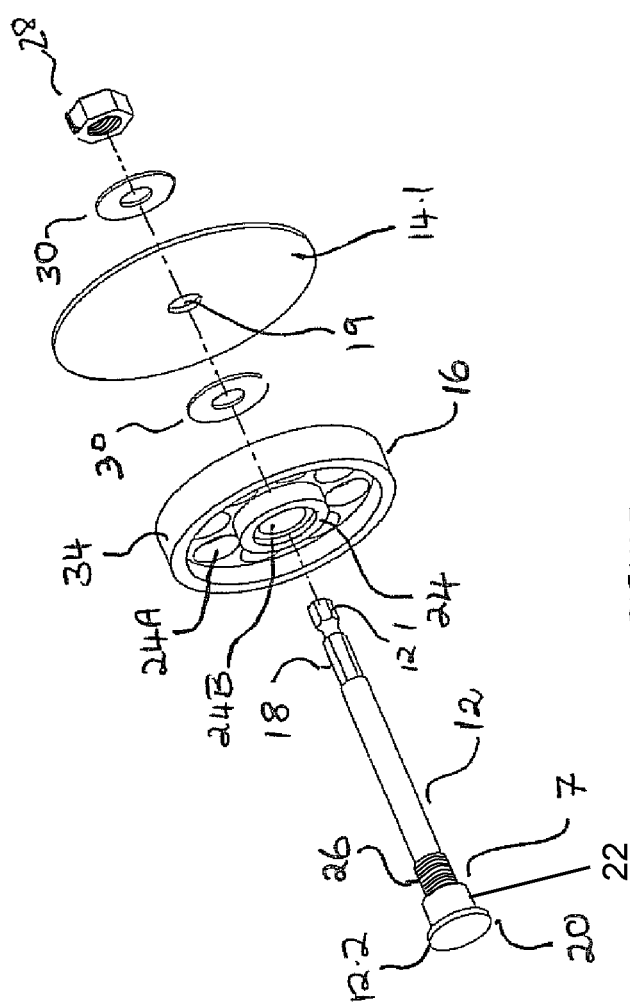

The device 10 includes an elongate carrier in the form of a rod or shaft 12 having a proximal end or free end 12.2, and a distal end or tool end 12.1 (i.e. engageable by a power tool). A cutting element in the form of a cutting disc 14 is arranged on the rod 12 to be rotatably fast with or fixedly attached to the rod 12. The cutting disc 14 is arranged closely adjacent to but spaced from a guide member in the form of a guide wheel 16 which is carried rotatably by the rod 12. The guide wheel 16 is, further, positioned closely adjacent surface 14.1 (FIG. 2) of the cutting disc 14 which has a central aperture 19.

An attaching formation in the form of a shank portion 18 is defined at the distal end 12.1 of the rod 12. The shank portion 18 is received in a gripping element such as a chuck of a power tool. The power tool is, for example, a conventional hand drill 138 as shown in FIG. 36.

A retaining formation in the form of a button 20 is mounted at the proximal end 12.2 of the rod 12. A boss 22 is defined adjacent to the button 20. The boss 22 has a larger diameter than the rod 12 but a smaller diameter than the button 20. The guide wheel 16 defines a seat or hub 24 within which the button 20 is received to retain the guide wheel 16 on the rod 12 with the guide wheel 16 being carried on the boss 22.

The rod 12 has a threaded portion 26 arranged adjoining the boss 22. The cutting disc 14 is held captive on the rod 12 by a nut 28 that engages the threaded portion 26 of the rod 12 with a screw thread engagement. The device 10 includes a pair of lock washers 30. The washers 30 are arranged on opposite sides of the cutting disc 14 and serve to lock the cutting disc 14 to the rod 12 so that the cutting disc 14, in use, rotates with the rod 12 under the action of the power tool to which the rod 12 is connected.

Figure 4:
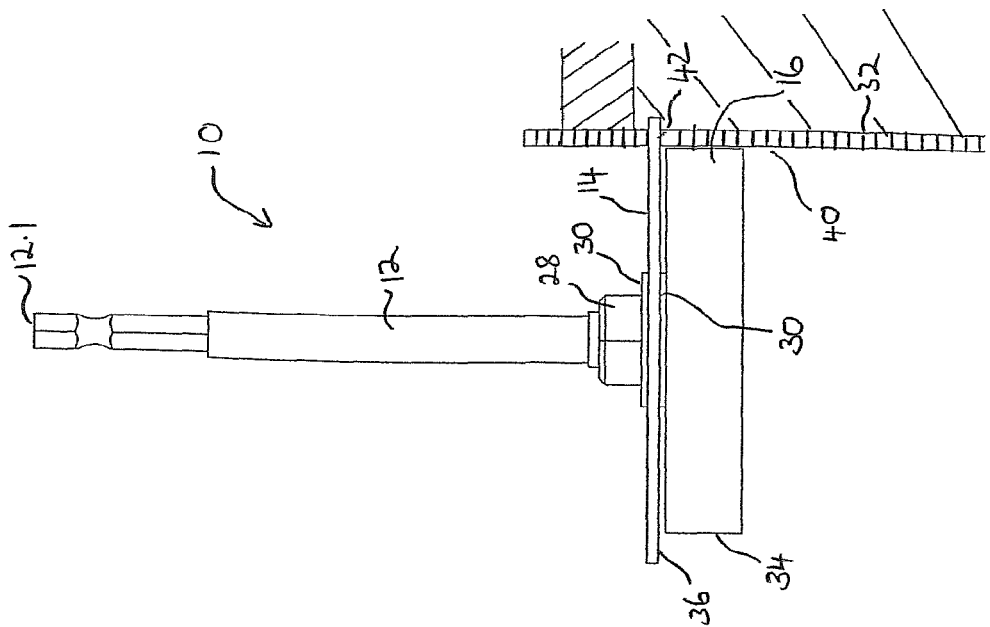
FIG. 3 shows a sectional view of the cutting device of FIG. 1 in use in cutting a pipe and FIG. 4 is a side view of the arrangement shown in FIG. 3.

The cutting disc 14 has a diameter which is less than the diameter of a pipe 32 (FIGS. 3 and 4) to be cut. The guide wheel 16, in turn, has a diameter which is less than the diameter of the cutting disc 14. The guide wheel 16 defines a bearing surface 34 which extends parallel to a longitudinal axis of the rod 12. A peripheral space 36 defined between a cutting edge of the cutting disc 14 and the bearing surface 34 of the guide wheel 16 serves as a depth gauge and facilitates a user cutting the pipe to the required depth as shown in FIG. 4 of the drawings.

The cutting disc 14 is any suitable abrasive cutting disc such as a tungsten-carbide disc or a diamond tipped disc.

The device 10 is sold as a pre-assembled unit or can be provided as a number of components which can be assembled together, e.g. in kit form, with the rod 12, the nut 28, the pair of washers 30, one or more cutting discs 14, which may be of different diameters, and one or more guide wheels 16 of different diameters. By having guide wheels of different diameters, the depth of cut that can be made with the cutting device can be varied. If the device 10 is provided as a kit, a required size of cutting disc 14 and guide wheel 16 are selected and mounted on the rod 12. The guide wheel 16 is received on the boss 22 with the button 20 being received in the seat 24 of the cutting wheel 16. The guide wheel also includes apertures 24A defined therein for air flow and to reduce the amount of material used in the guide wheel 16. It also includes a central aperture 24B which is passed over the rod 12 to mount the guide wheel 16 on the rod 12.

The boss 22 is received within the central aperture 24B of the guide wheel 16 a loose fit within the guide wheel 16 so that the guide wheel 16 can rotate relative to the rod 12. The selected cutting disc 14 is mounted on the rod 12 adjacent to the guide wheel 16 and is secured in position by the nut 28. The combination of the nut 28 being screwed on to the threaded portion 26 with the provision of the lock washers 30 serve to lock the cutting disc 14 to the rod 12. The disc 14 is fast with the rod 12 and rotates together with the rod 12.

In the example illustrated, the device 10 is used to cut a pipe 32 below a floor 38 in a building. It is noted that the diameter of the cutting disc 14 is less than the diameter of the pipe 32 to be cut.

The power tool, such as hand drill 138, to which the device 10 has been attached is operated to rotate the rod 12 and the cutting disc 14 attached to the rod 12. An edge of the cutting disc 14 is placed against an inner surface 40 of the pipe 32 and first cut 42 is made in a wall of the pipe 32. The cutting disc 14 cuts to a depth governed by the space 36 between the edge of the cutting disc 14 and the bearing surface 34 of the guide wheel 16. In other words, the cutting disc 14 cuts through the wall of the pipe 32 until the bearing surface 34 bears against the internal surface of the pipe 32 as shown in FIG. 4 of the drawings.

Figure 3:
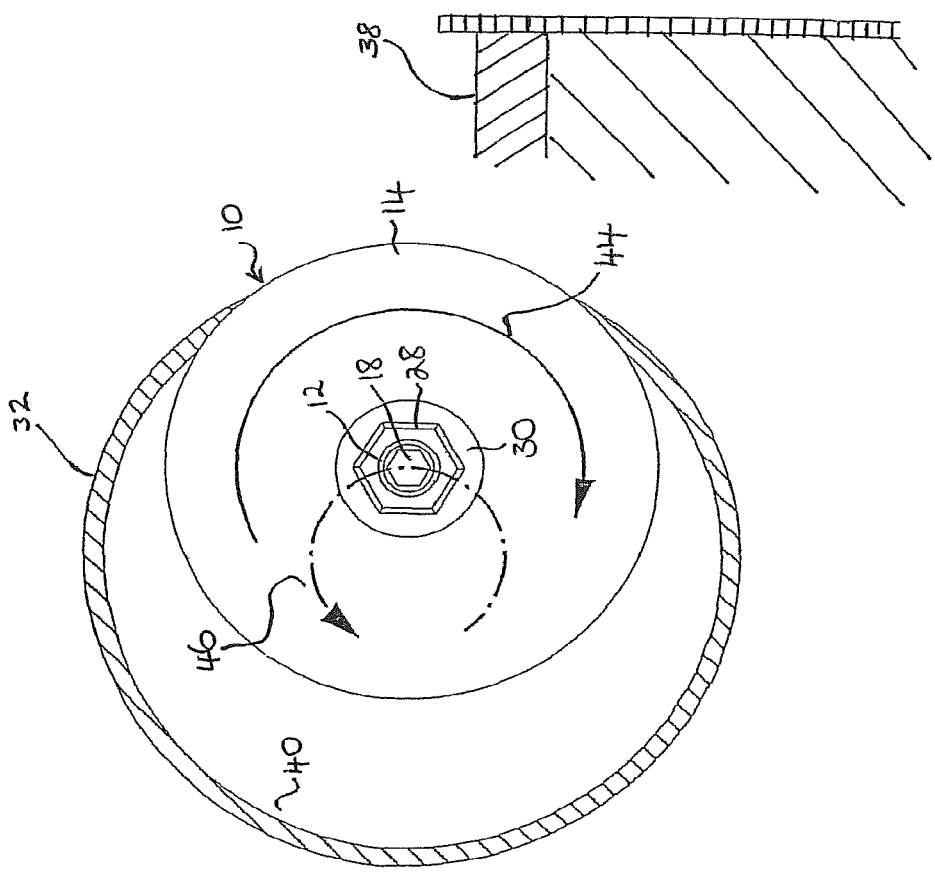

In the illustrated embodiment, it is assumed that the rod 12 is rotated clockwise as shown by arrow 44 in FIG. 3 of the drawings. Due to the guide wheel 16 bearing against the internal surface 40 of the pipe 32 after the required depth of cut 42 has been attained, a counter-rotational movement of the device 10 is set up about the longitudinal axis of the pipe 32 as shown by arrow 46 in FIG. 3 of the drawings. This assists the user in cutting the pipe 32 and maintaining a uniform height of cut. It will also be appreciated that the guide wheel 16 may also rotate in the same direction as cutting disc 14.

Moreover, when the cut has been completed about the circumference of the pipe 32, the guide wheel 16 serves to restrain the device 10 from flying out laterally from the pipe 32 which, but for the presence of the guide wheel 16, could otherwise occur. Thus, the likelihood of the user injuring himself or herself or causing damage to surrounding structure is obviated.

It will therefore be appreciated that the provision of the guide wheel 16 inwardly of the cutting disc 14 serves three functions at least. Firstly, the guide wheel 16 functions as a depth gauge to control the depth of the cut of the wall of the pipe 32. The guide wheel 16 further serves to assist in the counter-rotational movement of the device 10 about the internal surface 40 of the pipe 32 to form a circumferential cut in the pipe 32. Thirdly, the guide wheel 16 serves to restrain the device 10 after completion of the cut.

It is therefore an advantage of the described embodiment that a pipe cutting device 10 is provided which enables a user to perform an even, uniform cut which is at right angles to the longitudinal axis of the pipe 32. The provision of the guide wheel 16 serves as a depth gauge to enable the user to control the depth of the cut. In addition, the provision of the guide wheel 16 advantageously serves to assist in rotating the device 10 about the longitudinal axis of the pipe during the cutting operation. The guide wheel 16 also serves to restrain the device 10 against lateral movement beyond the confines of the pipe 32 after completion of the cutting operation.

It is a further advantage of the described embodiment that, if desired, different diameters of cutting discs 14 and guide wheels 16 can be mounted on the rod 12 in a simple operation by unscrewing the nut 28 from the threaded part 26 of the rod 12. With the described configuration of the rod 12, the entire rod 12 need not be threaded so it is a reasonably simple and quick matter to remove and replace the nut 28.

As described above, the device 10 could be sold in sets where a rod 12 is provided with various sizes of cutting discs 14 and/or guide wheels 16. In addition, the set could merely have replacement cutting discs 14 so that blunt cutting discs 14 can be replaced by sharp cutting discs 14.

While the embodiment has been described with reference to a pipe 32 of circular cross-section, it will be appreciated that the device 10 could, conceivably, be used with pipes of other cross-section albeit with lower efficiency.

Figure 5:
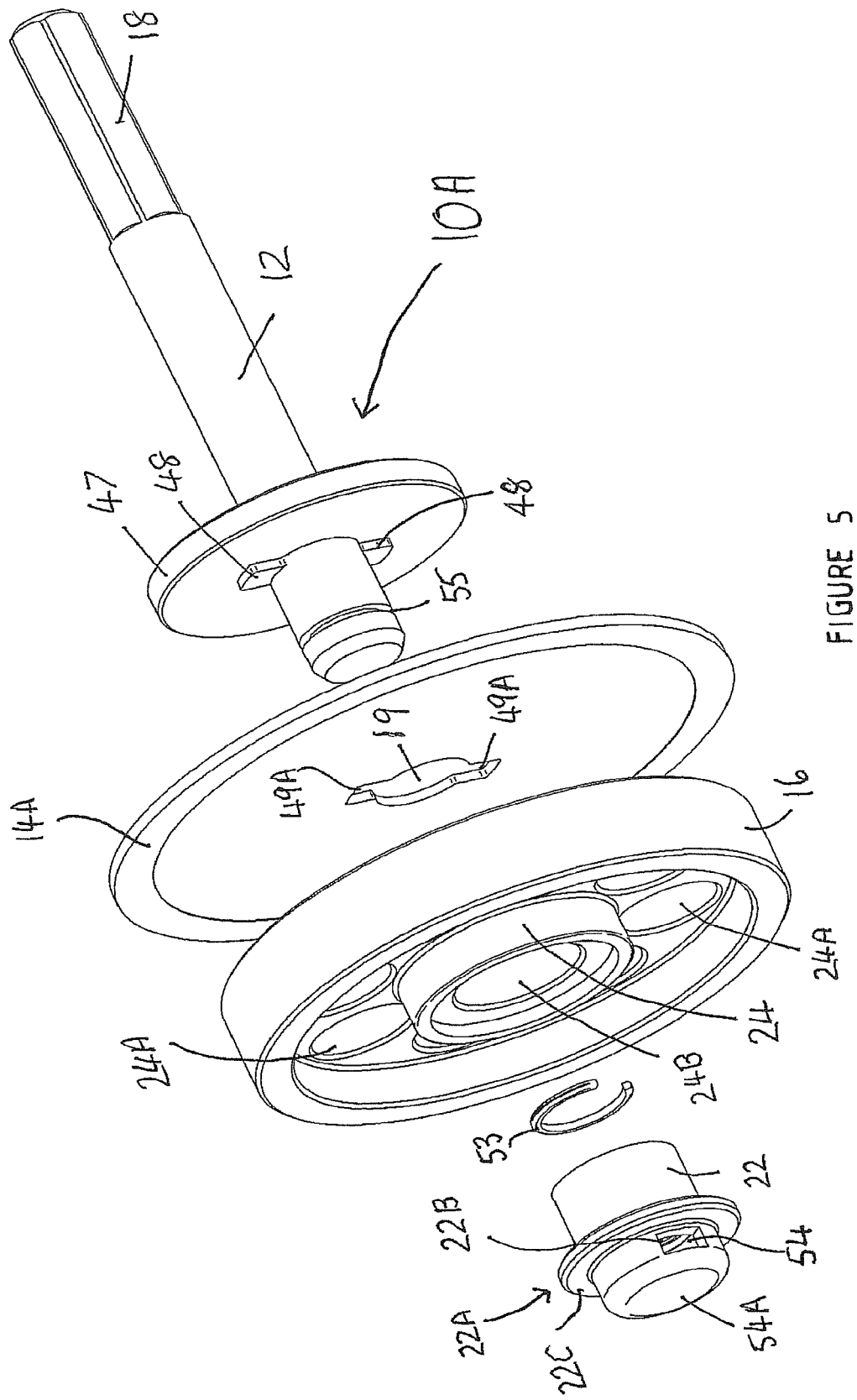
FIG. 5 shows an exploded perspective view of a second embodiment of the invention wherein use is made of a compression ring.
Figure 6C:
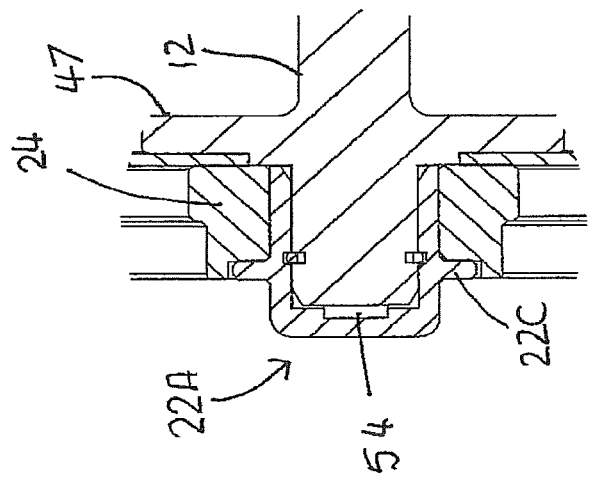
FIGS. 6A, 6B and 6C are sectional views of the cutting device shown in FIG. 5 showing the installation of the end cap to the rotatable shaft.
Figure 6B:
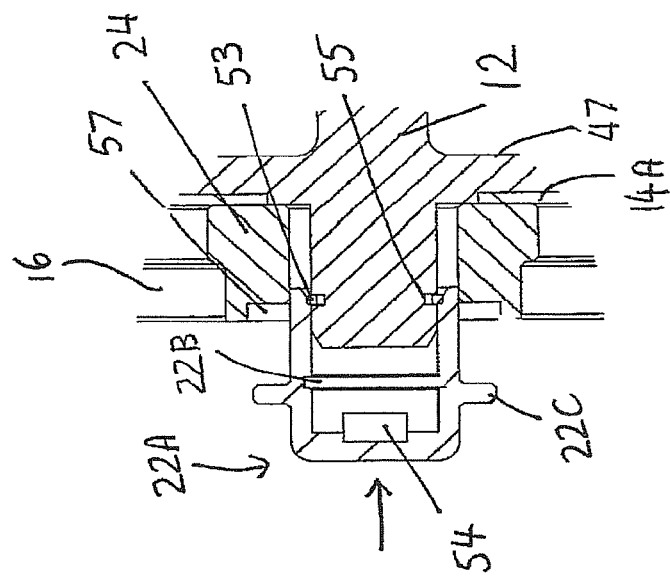
Figure 6A:
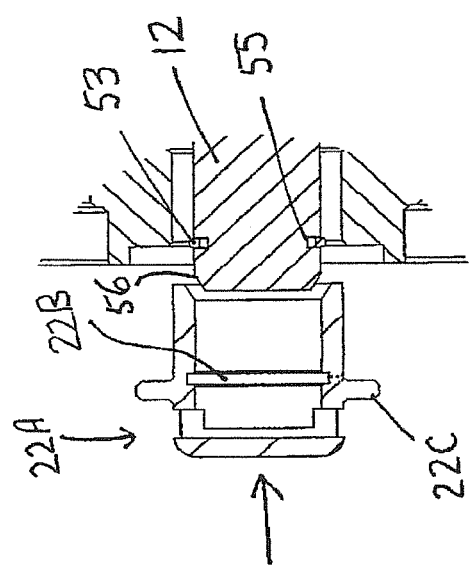

In FIGS. 5, 6A, 6B and 6C there is shown a further embodiment of the invention showing cutting device 10A which includes similar components as described above using the same reference numerals. In this embodiment there is provided an end cap 22A having an internal groove 22B for supporting a snap or compression ring 53 made of an elastomeric or flexible material which can be C shaped as shown. There is also shown a disc 47 which is welded or which is a permanent part of shaft 12 formed by a machining operation. Disc 47 is also provided with keys 48 and groove 55 which also supports snap ring 53 as shown in FIGS. 6A, 6B and 6C. Cutting disc 14A is provided with central aperture 19 having top and bottom keyways or recesses 49A. End cap 22A is also provided with flange 22C and end wall 54A. There is also provided lever aperture 54.

The process of installing the end cap 22A on shaft 12 is shown sequentially in FIGS. 6A, 6B and 6C and by the arrows in FIGS. 6A and 6B. The snap ring 53 is held captive in groove 22B and as end cap 22A is pressed onto shaft 12 its tapered lead in surface 56 collides with snap ring 53. When the pressing force on end cap 22A is greater than the natural resistive force associated with snap ring 53 the snap ring 53 will reduce its diameter via physical displacement to a point where the internal diameter of end cap 22A equals the outside diameter of snap ring 53. At this stage the end cap 22A can slide onto shaft 12 until snap ring 53 meets with internal groove 22B. At this point snap ring 53 will return to an outside diameter that equals the diameter of groove 22B. At this stage the design of groove 22B will be such that snap ring 53 will be providing a positive force against the internal surface of groove 22B which is then translated to cutting disc 14A. This force enables cutting disc 14A to fully engage with keys 48 and thus allows guide wheel 16 to rotate around the longitudinal axis of end cap 22A freely. This force also prevents cutting disc 14A, end cap 22A and guide wheel 16 from sliding off shaft 12. To release the end cap from the shaft 12 the same force is applied to end cap 22A via a lever inserted in slot 54 and the same process occurs in reverse. In FIG. 6C it will be noted that flange 22C engages in peripheral space 57.

The above-described embodiment in FIGS. 5 and 6A, 6B and 6C is useful for cutting device 10A on pipes or sheets made from different plastics materials such as HDPE or PVC or metals including copper and stainless steel or other materials including ceramics and earthenware.

Figure 7:
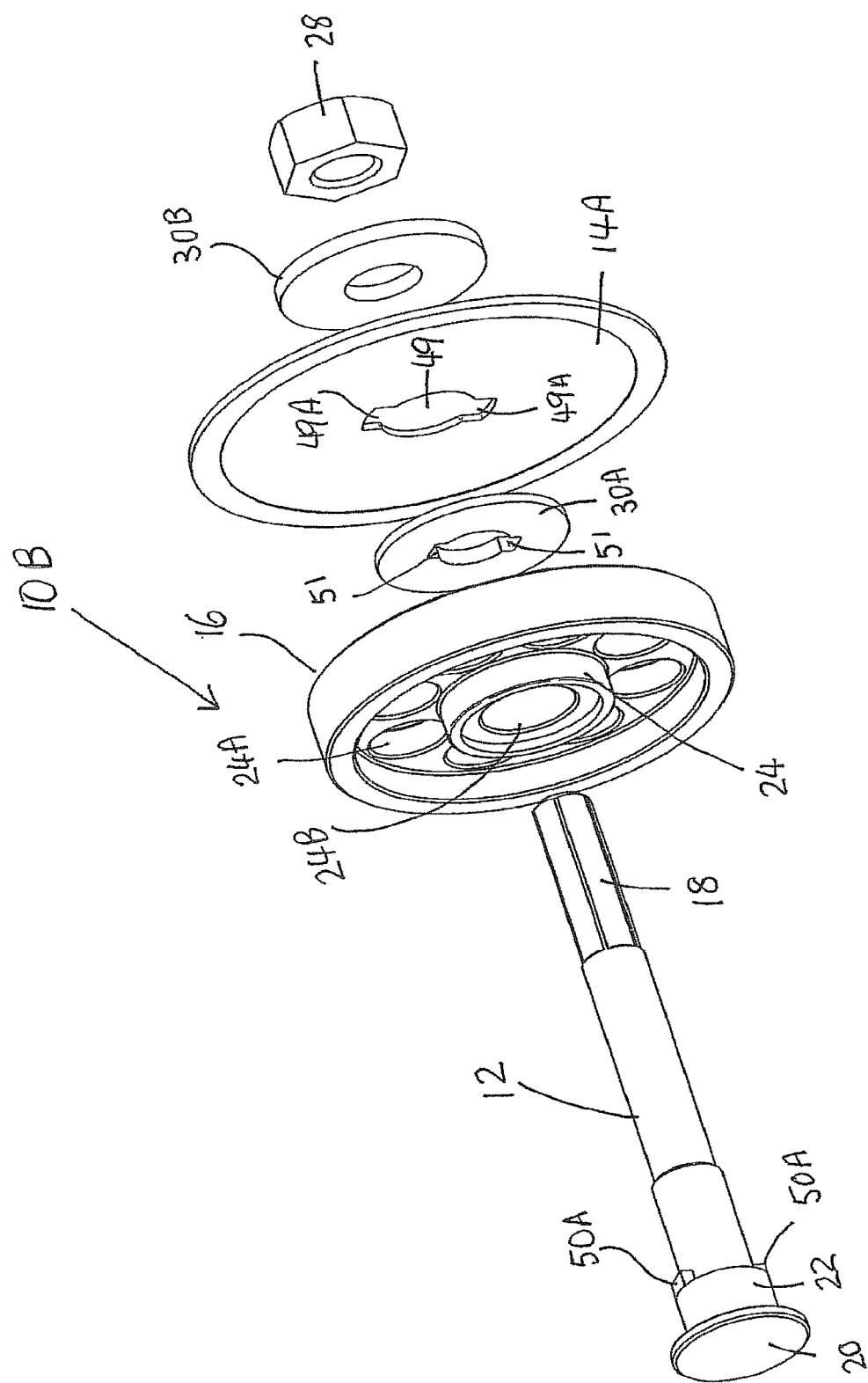
FIG. 7 is an exploded perspective view of a third embodiment of the present invention.

In FIG. 7 there is shown another embodiment in relation to cutting device 10B which has top and bottom projections or keys 50A on shaft 12 adjacent boss 22 which pass through as is the case with the embodiment of FIG. 5 keyways 51 of washer 30A and top and bottom keyways or recesses 49A of central aperture 49. Again, this is an example of a quick release coupling initiated by removal of nut 28.

Another embodiment is shown in FIGS. 8, 9, 10 and 11 showing cutting device 10C wherein use is made of a spring clip 56 having arms 57 and end projections 58. There is also provided a cutting disc 14C which is attached to shaft 12 having keyways 59 which engage with keys 60 on locking disc 61. There is also provided tubular bushing 62. Again, this is another example of a quick release coupling wherein spring clip 56 may be quickly dismantled by use of pliers or a screwdriver (not shown). In FIG. 9 shaft 12 is provided with a hollow passage 63 for accommodation of spring clip 56.

In cutting device 10C the spring clip 56 is in the form of a spring steel clip and is designed to provide a force that encapsulates guide wheel 16 and cutting disc 14C. This is achieved by each of arms 57 being biased inwardly. As shown in FIGS. 9-10, by means of depressing end projections or tabs 58, the clip 56 may be inserted into hollow interior 63 of shaft 12 inside bushing 62. When projections 58 are released the clip 56 may be retained in position inside hollow interior 63 of shaft 12 and hollow passage 64 of shaft 12 as shown with projections 58 engaging in retaining notches 65 as shown in FIG. 11. This enables the cutting disc 14A to be fully engaged and securely retained by keys 60 on shaft 12.

In the embodiment of FIGS. 12-15, there is shown cutting device 10D which has shown a similar arrangement as described above for FIGS. 8-11 using a spring clip 56A which has arms 57A and end projections 58A. Clip 56A also has aperture 66 for retention of retaining screw 67. There is also provided end cap 68 to which spring clip 56A is attached by retaining screw 67. End cap 68 also has lever slot 69 in head 70 and shank 71. There is also provided a hollow bush 72 with end projections 73 which engage with mating slots 74 in end cap 68. Bush 72 has flange 75 with keyways 76 which mate with keyways 77 of cutter disc 14D. Both keyways 76 and 77 mate with keys 78 on disc 79 integral with shaft 12 to provide a positive force between the end cap 68 and the cutting disc 14D. When first engaging the end cap 68 into the shaft 12, the locking arms 57A collide with the tapered lead-in 80 on the shaft 12 as shown in FIGS. 13-14. At this point when the pressing force on the end cap 68 is larger than the combined friction and spring clip 56A bending forces, the locking arms 57A begin to displace normal toward the center axis of the shaft 12. When the locking arms 57A meet with internal groove 81 toward the base of the shaft internal cavity 72A, the spring clip 56A resistive bending force translates to projections 58A when they press against the tapered wall 84 of groove 81, driving the end cap 68 further inward along the axis of the shaft 12. With the end cap 68 fully engaged, there is always a positive force provided by the spring clip 56A translated to the tapered wall 84 on groove 81. This force is then translated through a flat surface 83 of the end cap 68 which is perpendicular to the shaft axis. This surface 83 presses against the shaft bushing 72 which then presses against the cutting disc 14D providing a positive force that enables the cutting disc 14D to be fully engaged on the shaft key 78. An added feature of cutter device 10D is that as the shaft 12 rotates it is providing a centripetal force to the locking arms 57A. As this acceleration increases so too does the centripetal force which translates to the tapered wall 84 on the inner groove 81 of the shaft increasing the pressure applied to the cutting disc 14D, therefore increasing the force required to displace the cutting disc 14D in its operation as shown in FIG. 15.

In the embodiment shown in FIGS. 16-19, a similar arrangement is shown as in FIGS. 12-15 with the exception that spring clip 56A is replaced with compression spring 86, transverse tapered locking pins 87 and end pin 88. Cutting device 10E functions to provide a positive force between the end cap 68 and the cutting disc 14D. When first engaging end cap 68 into the shaft cavity 82 the tapered locking pins 87 collide with the tapered lead-in 80 in shaft cavity 82. At this point when the pressing force on the end cap 68 is larger than the combined friction and spring forces, the tapered locking pins 87 begin to displace normal toward the center axis of the shaft 12. This displacement translates into longitudinal displacement of the tapered spring end pin 88 via the taper shared between mating surfaces 89 and 90 on the locking pins 87 and the tapered spring end pin 88 as shown in FIGS. 17-18. This in turn displaces the compression spring 86 which is providing the resistive force. When the tapered locking pins 87 meet with internal groove 81 toward the base of the shaft cavity 82, the spring force translates to locking pins 87 which then presses against tapered wall 84 driving the end cap 68 further inward along the axis of the shaft 72. With the end cap 68 fully engaged there is always a positive force provided by the compression spring 86 translated to the tapered wall 84. This force is then translated through flat surface 83 of the end cap 68 which is perpendicular to the shaft 12 axis. This end cap surface 83 presses against the shaft bushing 72 which then presses against the cutting disc 14D providing a positive force that enables the cutting disc 14D to be fully engaged on the shaft key 78 as shown in FIG. 19. An added feature of cutting device 10E is that as the shaft 12 rotates it is providing a centripetal force to the locking pins 87. As this acceleration increases, so too does the centripetal force which translates to the tapered wall 84 increasing the pressure applied to the cutting disc 14D, therefore increasing the force required to displace the cutting disc 14D whilst in operation.

The cutting device 10F shown in FIGS. 20, 21 and 22 uses the cutting disc 14F with the keyways 91 that engage with the keys 78. There is also provided a fastener 92 having a shank 93 with a screw thread that engages an internal thread 94 of adjacent end 95 of shaft 12 as shown in FIGS. 21-22. Fastener 92 also has head 93A, flange 96 and screwdriver slot 94. There is also shown bushing 72A. Fastener 92 is used to provide a force that encapsulates the guide wheel 16 and the cutting disc 14F, by means of engaging with internal thread 94. The fastener 92 when fully engaged provides a force against a shaft bushing 72A that in turn translates that force to the cutting disc 14F. This force enables the cutting disc 14F to fully engage with the key 78 on the shaft 12 and allows the guide wheel 16 to rotate around the longitudinal axis of the shaft 12 freely. This force also prevents the cutting disc 14F, bushing 72A and guide wheel 16 from sliding off the shaft 12. FIG. 22 shows flange 97 of bushing 72A interposed between cutting disc 14F and hub 24 of guide wheel 16.

In FIG. 23 there is provided cutting device 10G having an eccentric adjustable cam 100, an adjustment nut 99 which is mounted on screw threaded shaft 101 of shaft connection collar 102, an oval shaped aperture 103 for retention of shaft connection collar 102 and a slot 104. The aperture 103 has opposed end walls 103A which determine the extent of movement of collar 102 in aperture 103. There is also shown an attachment aperture 106 of eccentric adjustable cam 100. The operation of cutting device 10G is shown in FIGS. 24, 25 and 26. There is also shown dust collection vanes 107 for directing dust in use away from the operator of cutting device 10G.

The cutting device 10G can be used in relation to a variety of wall thicknesses and thus functions as a wall thickness gauge. The operation uses eccentric adjustable cam 100 in combination with guide wheel 16 and cutting disc 14G being loosely fitted to shaft 12. By turning adjustment nut 99 in either direction the center of shaft axis will change in relation to guide wheel 16. Thus, the shaft axis may move from a central position shown in FIG. 24 to an eccentric position dependent on the number of turns of nut 99 shown in FIGS. 25 and 26. This eccentricity causes the center of force to move in relation to guide wheel 16 creating a moment of force around the rotating shaft 12. This in turn allows the guide wheel 16 to be naturally positioned at the desired gauge of wall thickness independent of the position of cutting disc 14G as shown in FIGS. 26 and 27.

In FIG. 27 there is shown an assembled view of cutting device 10G. There is shown the rotating shaft center 108 and the line of force 109 is perpendicular to the medium being cut. There is also shown the wall thickness indicated by 110.

In FIG. 28 there is shown one form of cutting disc 111 which in operation is of directional design to provide a low pressure vortex to create a vacuum surrounding the cutting disc 111 which is dependent on rotational direction. This cutting disc and its elevated deflectors 113 is effective to draw the dust and swarf 113A away from the surface of the article being cut and down through apertures 114 adjacent each deflector 113. This cutting disc 111 is effective in extraction of dust and swarf away from the face of the user.

In FIG. 29 there is shown cutting disc 115 which again is of a unidirectional design to provide a low pressure area towards the center 19 of cutting disc 115 independent of rotational direction. This design is effective to draw dust and swarf away from the article being cut and down through apertures 114A adjacent deflector vanes 113A.

In FIG. 30 there is shown a unidirectional cutting disc 116 which provides a low pressure area close to cutting face 112 independent of rotational direction. This design is effective to draw the dust and swarf away from the surface of the article being cut and through apertures 118 adjacent deflectors 117 and thus away from the face of the user.

In FIG. 31 there is shown a variable diameter guide wheel 16A used for controlling depth of cut for cutting devices. Guide wheel 16A comprises of a top disc component 120, a bottom disc component 120A, several vane components 121 and several curved vane connection components 122. Guide wheel 16A uses a worm drive 123 that controls the amount of rotation that the top component 120 performs in relation to the bottom component 120A. When the worm drive 123 is actioned the top disc component 120 rotates causing the internal pins 125 that are connected to the top disc component 120 and are held captive in a slot 126 to press against an adjacent surface of the slot 126. The vane components 121 are also held captive to the bottom disc component 120A by means of pins 124 which pass through apertures 127 which also act as a pivot point for the vane components 121. The vane components 121 are able to rotate around the pivot point 127 therefore changing the outside diameter of the vane components 121. The curved vane connection components 122 are joined to the vane components 121 at mutually adjacent ends via a pin 128 shown in phantom again acting as a pivot point. Each of components 121 and adjacent ends of components 122 are joined by a pin 128 which moves in slot 129. This slot 129 allows the curved vane connection components 122 to move tangentially to that slot thus maintaining a connection between each vane component 121.

There is also provided locating projections 130 of bottom disc component 120A which each locate in mating recesses 131 of top disc component 120. The worm drive 123 is contained in housing 132 and actioned by a screwdriver (not shown) engaging slots 133 and 134.

In FIGS. 32, 33, 34 and 35 there is shown the guide wheel 16A mounted on shaft 12 in combination with dust extraction disc 116. This is accomplished by the use of end cap 68 as shown in FIGS. 33, 34 and 35.

In FIG. 36 there is cutting device 10H shown in FIGS. 32-35 utilized in cutting a planar panel 136. The cutting device 10H has already formed the cutting line 137 shown in the drawings.

One advantage of the cutting device described above with reference to the drawings is that the guide or support member that is in the form of the guide wheel 16 is located on the other side of the blade 14 to the tool end 12.1 that is operatively coupled to a power tool. Applicant has found that the cutting device can be mounted in a very stable manner in position on a work piece when the blade is rotating at high speed with this arrangement. Without being bound by theory Applicant believes that this is due to the support provided by the guide wheel on the other side of the blade to the rotational drive imparted by the power tool. This feature results in a much more stable and comfortable operation of the cutting device by the user. It also helps the user to make a much more precise and accurate cut with the power tool. This is important because the cutting device can be used to cut off pipe sections that project above a floor or the like and it is highly desirable that this is done accurately and precisely.

It will of course be realized that the above has been given only by way of illustrative example of the invention and that all such modifications and variations thereto, as would be apparent to persons skilled in the art, are deemed to fall within the broad scope and ambit of the invention as is herein set forth.

We claim:

1. A cutting device for cutting through a sidewall of a pipe from an inside of the pipe, said cutting device comprising:
(i) an elongate carrier having a longitudinal axis, an attaching formation defined at a tool end of the elongate carrier for being received in a gripping element of a power tool, and said elongate carrier having a free end;
(ii) a guide wheel being rotatably attached to the free end of the elongate carrier such that the guide wheel may rotate freely relative to said elongate carrier, said guide wheel having an axis of rotation that is co-axial with the longitudinal axis of the elongate carrier, said guide wheel having a bearing surface extending parallel to the longitudinal axis of said elongate carrier, the bearing surface of the guide wheel for bearing against an inner surface of the pipe and for extending parallel to a longitudinal axis of the pipe, in use when cutting the pipe;
(iii) a cutting disc fixedly attached to the elongate carrier, the cutting disc having a peripheral cutting edge, and the cutting disc being located intermediate the guide wheel and the tool end, and the guide wheel having a diameter that is less than a diameter of the cutting disc, such that a peripheral space that is defined between the cutting edge of the cutting disc and the bearing surface serves as a depth gauge and facilitates cutting the pipe to the required depth, the cutting disc for cutting into the pipe to a depth where the bearing surface of the guide wheel bears against the inner surface of the pipe, and where the guide wheel moves along the inner surface of the pipe as the cut is extended around the full circumference of the pipe;
(iv) a button mounted, fastened, or otherwise formed at said free end of said elongate carrier, said button having a first diameter that is larger than a second diameter of said elongate carrier; and
(v) a substantially cylindrical boss mounted, fastened, or otherwise formed on said carrier adjoining a distal end of said button, wherein said first diameter of said button is larger than a third diameter of said boss, and wherein said third diameter of said boss is larger than said first diameter of said elongate carrier.

2. The cutting device of claim 1, wherein said axial distance between the cutting disc and the guide wheel is 0.5 mm-1.0 mm.

3. The cutting device of claim 1, wherein a hub is formed on a proximal end of said guide wheel, said hub having a proximal opening with a fourth diameter that is larger than said first diameter of said button, said hub having a distal opening with a fifth diameter that is smaller than said first diameter of said button, and wherein said button is positioned within said hub and wherein said guide wheel is configured to rotate freely around said boss.

4. A method of use of a cutting device to cut off pipe sections of a pipe that extends from a floor, from an inside of the pipe, which includes the following steps:
(a) attaching a first end of a rotatable elongate carrier to a power tool, said elongate carrier having a longitudinal axis extending through a length of the elongate carrier, a guide wheel being rotatably attached to the elongate carrier at a second end of the elongate carrier such that the guide wheel may rotate freely relative to said elongate carrier, and a cutting disc being fastened to the rotatable elongate carrier intermediate the guide wheel and the first end, the cutting disc having a peripheral cutting edge, wherein said cutting disc also has a greater transverse dimension than the guide wheel and is located closely adjacent to the guide wheel so as to form a peripheral space between a bearing surface of the guide wheel and the peripheral cutting edge of the cutting disc, wherein an axial distance between the cutting disc and the guide wheel is 0.5 mm-5.0 mm;
(b) inserting the rotatable elongate carrier, the guide wheel and the cutting disc into the pipe with the elongate carrier attached to the power tool so that the cutting disc is inside said pipe;
(c) operating the power tool to cause rotation of the rotatable elongate carrier and the cutting disc to cut the pipe from the inside of the pipe;
(d) placing said peripheral cutting edge of the cutting disc against an inner surface of the sidewall of the pipe to make a cut in the pipe to a depth where the bearing surface of the guide wheel bears against the inner surface of the pipe with the bearing surface of the guide wheel being parallel to a longitudinal axis of the pipe;
(e) moving the rotatable elongate carrier, the guide wheel and the cutting disc around the longitudinal axis of the pipe to extend the cut around the full circumference of the pipe with the guide wheel rotating along the inner surface of the pipe; and (f) restraining the cutting device with the guide wheel when the cut has been completed by maintaining the bearing surface of the guide wheel against the inner surface of a non-detached portion of said pipe, wherein said cutting device further comprises a button mounted, fastened, or otherwise formed at said second end of said elongate carrier, said button having a first diameter that is larger than a second diameter of said elongate carrier, wherein said cutting device further comprises a substantially cylindrical boss mounted on said elongate carrier adjoining a distal end of said button, wherein said first diameter of said button is larger than a third diameter of said boss, and wherein said third diameter of said boss is larger than said first diameter of said elongate carrier.

5. The method of claim 4, wherein said axial distance between the cutting disc and the guide wheel is 0.5 mm-1.0 mm.

6. The method of claim 4, wherein a hub is formed on a proximal end of said guide wheel, said hub having a proximal opening with a fourth diameter larger than said first diameter of said button, said hub having a distal opening with a fifth diameter smaller than said first diameter of said button, and wherein said button is positioned within said hub and wherein said guide wheel is configured to rotate freely around said boss.

7. The cutting device of claim 1, wherein said axial distance between the cutting disc and the guide wheel is 0.5 mm-5.0 mm.

8. The cutting device of claim 1, wherein said axial distance between the cutting disc and the guide wheel is 0.5 mm-20.0 mm.

9. A cutting device for cutting through a sidewall of a pipe from an inside of the pipe, said cutting device comprising:

(i) an elongate carrier having a longitudinal axis, an attaching formation defined at a tool end of the elongate carrier for being received in a gripping element of a power tool, and said elongate carrier having a free end;

(ii) a guide wheel being attached to the free end of the elongate carrier, said guide wheel having a bearing surface extending parallel to the longitudinal axis of said elongate carrier, the bearing surface of the guide wheel for bearing against an inner surface of the pipe and for extending parallel to a longitudinal axis of the pipe, in use when cutting the pipe;

(iii) a cutting disc fixedly attached to the elongate carrier, the cutting disc having a peripheral cutting edge, and the cutting disc being located intermediate the guide wheel and the tool end, and the guide wheel having a diameter that is less than a diameter of the cutting disc, such that a peripheral space that is defined between the cutting edge of the cutting disc and the bearing surface serves as a depth gauge and facilitates cutting the pipe to the required depth, the cutting disc for cutting into the pipe to a depth where the bearing surface of the guide wheel bears against the inner surface of the pipe, and where the guide wheel moves along the inner surface of the pipe as the cut is extended around the full circumference of the pipe;

(iv) a button mounted, fastened, or otherwise formed at said free end of said elongate carrier, said button having a first diameter that is larger than a second diameter of said elongate carrier; and (v) a substantially cylindrical boss mounted, fastened, or otherwise formed on said carrier adjoining a distal end of said button, wherein said first diameter of said button is larger than a third diameter of said boss, and wherein said third diameter of said boss is larger than said first diameter of said elongate carrier.

10. The cutting device of claim 9, wherein said axial distance between the cutting disc and the guide wheel is 0.5 mm-1.0 mm.

11. The cutting device of claim 9, wherein said axial distance between the cutting disc and the guide wheel is 0.5 mm-5.0 mm.

12. The cutting device of claim 9, wherein said axial distance between the cutting disc and the guide wheel is 0.5 mm-20.0 mm.

13. The cutting device of claim 9, wherein a hub is formed on a proximal end of said guide wheel, said hub having a proximal opening with a fourth diameter that is larger than said first diameter of said button, said hub having a distal opening with a fifth diameter that is smaller than said first diameter of said button, and wherein said button is positioned within said hub.

* * * * *